United States Patent
Yokota et al.

(10) Patent No.: US 10,026,947 B2
(45) Date of Patent: Jul. 17, 2018

(54) BATTERY TERMINAL AND METHOD FOR MANUFACTURING BATTERY

(71) Applicant: HITACHI METALS, LTD., Tokyo (JP)

(72) Inventors: Masayuki Yokota, Suita (JP); Yoshimitsu Oda, Suita (JP)

(73) Assignee: HITACHI METALS, LTD., Tokyo (JP)

(*) Notice: Subject to any disclaimer, the term of this patent is extended or adjusted under 35 U.S.C. 154(b) by 64 days.

(21) Appl. No.: 15/219,826

(22) Filed: Jul. 26, 2016

(65) Prior Publication Data

US 2017/0054131 A1    Feb. 23, 2017

(30) Foreign Application Priority Data

Aug. 17, 2015 (JP) ................. 2015-160347

(51) Int. Cl.
| | |
|---|---|
| H01M 2/30 | (2006.01) |
| H01M 2/26 | (2006.01) |
| H01M 10/0525 | (2010.01) |
| B21D 39/03 | (2006.01) |

(52) U.S. Cl.
CPC ....... *H01M 2/305* (2013.01); *H01M 10/0525* (2013.01); *B21D 39/031* (2013.01); *H01M 2220/20* (2013.01); *Y02E 60/122* (2013.01); *Y02P 70/54* (2015.11); *Y02T 10/7011* (2013.01)

(58) Field of Classification Search
CPC ......... H01M 10/0525; H01M 2220/20; H01M 2/305; B21D 39/031; Y02E 60/122; Y02T 10/7011
See application file for complete search history.

(56) References Cited

U.S. PATENT DOCUMENTS

| | | | |
|---|---|---|---|
| 2003/0180582 A1* | 9/2003 | Masumoto | H01M 2/1066 429/7 |
| 2011/0039136 A1* | 2/2011 | Byun | H01M 2/0404 429/56 |
| 2014/0011074 A1 | 1/2014 | Oda et al. | |

FOREIGN PATENT DOCUMENTS

| | | |
|---|---|---|
| JP | 2015-60730 A | 3/2015 |
| WO | 2012/133654 A1 | 10/2012 |

* cited by examiner

*Primary Examiner* — Carlos Barcena
(74) *Attorney, Agent, or Firm* — Westerman, Hattori, Daniels & Adrian, LLP

(57) ABSTRACT

A battery terminal is made of a clad material in which a first metal layer made of an Al-based alloy, a second metal layer made of a Cu-based alloy, and a third metal layer made of a Ni-based alloy are bonded to each other in a state where the first metal layer, the second metal layer, and the third metal layer are stacked in this order. The battery terminal includes a shaft portion and a flange portion that radially expands from the shaft portion, and has the third metal layer at least in an end of the shaft portion on a first side in a shaft direction in which the shaft portion extends.

19 Claims, 10 Drawing Sheets

THICKNESS OF Ni LAYER AFTER PRESSING

| MEASUREMENT POSITION | EXAMPLE 1 | EXAMPLE 2 | EXAMPLE 3 |
|---|---|---|---|
| | THICKNESS OF Ni LAYER BEFORE PRESSING | | |
| | 25 μm | 50 μm | 100 μm |
| 1 | 30.9 | 45.1 | 81.2 |
| 2 | 3.5 | 8.3 | 19.9 |
| 3 | 2.3 | 2.7 | 4.4 |
| 4 | 20.0 | 32.0 | 56.6 |
| 5 | 2.2 | 2.8 | 4.2 |
| 6 | 2.8 | 8.9 | 19.7 |
| 7 | 26.3 | 43.0 | 79.8 |

(μm)

BATTERY TERMINAL AND METHOD FOR MANUFACTURING BATTERY

CROSS-REFERENCE TO RELATED APPLICATION

The priority application number JP2015-160347, Battery Terminal and Method for Manufacturing Battery Terminal, Aug. 17, 2015, Masayuki Yokota et al., upon which this patent application is based, is hereby incorporated by reference.

BACKGROUND OF THE INVENTION

Field of the Invention

The present invention relates to a battery terminal applicable to a lithium-ion battery, for example, and a method for manufacturing the terminal battery, and more particularly, it relates to a battery terminal including a first metal layer made of an Al base alloy and a second metal layer made of a Cu base alloy and a method for manufacturing the battery terminal.

Description of the Background Art

A battery terminal including a first terminal member made of an Al base alloy and a second terminal member made of a Cu base alloy is known in general, as disclosed in Japanese Patent Laid-Open No. 2015-060730, for example.

Japanese Patent Laid-Open No. 2015-060730 discloses a connector terminal including a first terminal member and a second terminal member, one of which is made of Cu and the other of which is made of Al, in which the first terminal member and the second terminal member are integrated. The first terminal member of this connector terminal includes a female flange provided with a recessed portion and a shaft portion extending from the female flange toward a first side. The second terminal member includes a male flange fitted into the recessed portion of the female flange and a shaft portion extending from the male flange toward a second side. In the connector terminal according to Japanese Patent Laid-Open No. 2015-060730, the female flange is swaged in a state where the male flange of the second terminal member is fitted into the recessed portion of the female flange of the first terminal member to be in close contact with the female flange of the first terminal member, whereby the first terminal member and the second terminal member are integrated.

Furthermore, in general, on a surface of a battery terminal made of Cu, Ni plating processing is performed in order to facilitate welding such as laser welding when the battery terminal is welded to another member such as a collector of a battery.

In the connector terminal disclosed in Japanese Patent Laid-Open No. 2015-060730, however, even if the first terminal member and the second terminal member are in close contact with each other by swaging, the first terminal member and the second terminal member are simply physically in contact with each other, and hence water, for example, is likely to enter between (interface) the first terminal member and the second terminal member. Thus, electricity flows in between (interface) the first terminal member and the second terminal member through the water, and hence a phenomenon (bimetallic corrosion) in which the terminal member made of metal (Al) easily ionized is corroded (exhausted) is disadvantageously likely to occur. Even if Ni plating processing is performed on a surface of the terminal member of the connector terminal, made of Cu, corrosion is conceivably likely to occur between the first terminal member and the second terminal member that are simply physically in contact with each other, similarly to the case where no Ni plating processing is performed.

SUMMARY OF THE INVENTION

The present invention has been proposed in order to solve the aforementioned problem, and an object of the present invention is to provide a battery terminal capable of being easily welded to another member while significantly reducing occurrence of corrosion on an interface between metal layers and a method for manufacturing the battery terminal.

A battery terminal according to a first aspect of the present invention is made of a clad material in which a first metal layer made of an Al-based alloy, a second metal layer made of a Cu-based alloy, and a third metal layer made of a Ni-based alloy are bonded to each other in a state where the first metal layer, the second metal layer, and the third metal layer are stacked in this order, and includes a shaft portion and a flange portion that radially expands from the shaft portion, and the third metal layer is located at least in an end of the shaft portion on a first side in a shaft direction in which the shaft portion extends. The "Al-based alloy" includes pure Al and an Al alloy mainly containing Al, the "Cu-based alloy" includes pure Cu and a Cu alloy mainly containing Cu, and the "Ni-based alloy" includes pure Ni and a Ni alloy mainly containing Ni.

As hereinabove described, the battery terminal according to the first aspect of the present invention is made of the clad material in which the first metal layer made of the Al-based alloy, the second metal layer made of the Cu-based alloy, and the third metal layer made of the Ni-based alloy are bonded to each other in a state where the first metal layer, the second metal layer, and the third metal layer are stacked in this order. Thus, the metal layers are not bonded to each other in physical contact with each other, but are atomically (chemically) bonded to each other by inter-diffusion of metal atoms resulting from clad bonding, and hence entry of water or the like to interfaces between the metal layers bonded to each other can be significantly reduced. Thus, occurrence of corrosion on the interfaces between the metal layers bonded to each other can be significantly reduced. Furthermore, the battery terminal has the third metal layer made of the Ni-based alloy located at least in the end of the shaft portion on the first side in the shaft direction in which the shaft portion extends. Thus, as compared with the case where only the second metal layer made of the Cu-based alloy is located in the end of the shaft portion on the first side in the shaft direction, the battery terminal can be easily welded to another member by laser welding.

Furthermore, when the third metal layer made of the Ni-based alloy is formed by Ni plating processing, it is necessary to form a mask on an exposed portion of the Al-based alloy (first metal layer) to perform Ni plating processing in order to significantly reduce corrosion of the first metal layer made of the Al-based alloy by plating liquid, pretreatment liquid, or the like. Thus, in order to form the mask on only a part of the battery terminal, steps for forming the mask are complicated, and hence manufacturing steps for the battery terminal are complicated. On the other hand, as hereinabove described, in the battery terminal according to the first aspect of the present invention, the clad material including the third metal layer made of the Ni-based alloy is employed, whereby no step for Ni plating processing is necessary, and hence complication of the manufacturing steps for the battery terminal can be significantly reduced.

In the aforementioned battery terminal according to the first aspect, the third metal layer is preferably located in an outer circumferential surface portion of the shaft portion. According to this structure, the Ni-based alloy having a higher corrosion resistance than the Cu-based alloy is located in the outer circumferential surface portion of the shaft portion so that corrosion of the second metal layer from the outer circumferential surface portion of the shaft portion can be significantly reduced. Furthermore, the battery terminal can be easily welded to another member by laser welding not only in the end of the battery terminal on the first side in the shaft direction, in which the third metal layer is provided, but also in the outer circumferential surface portion of the shaft portion.

In the aforementioned battery terminal according to the first aspect, the second metal layer made of the Cu-based alloy is preferably exposed on an outer edge of the flange portion on the first side in the shaft direction. According to this structure, the second metal layer made of the Cu-based alloy has a color close to red unlike the Al-based alloy and the Ni-based alloy, and hence the first side of the battery terminal in the shaft direction can be easily confirmed on the basis of the second metal layer exposed on the outer edge of the flange portion on the first side in the shaft direction.

In this case, the second metal layer is preferably annularly exposed along the outer edge of the flange portion on the first side in the shaft direction. According to this structure, by annular exposure of the second metal layer, an exposed portion of the second metal layer can be effectively restrained from hiding behind the shaft portion etc. so that the same cannot be confirmed, and hence the first side of the battery terminal in the shaft direction can be easily and reliably confirmed.

In the aforementioned battery terminal according to the first aspect, the shaft portion is preferably provided with a recessed portion on a side bonded to a collector of a battery on the first side in the shaft direction, and the third metal layer is preferably located in an inner circumferential surface portion of the recessed portion. According to this structure, the battery terminal is swaged to another member (the collector of the battery) by bending the recessed portion such that the inner circumferential surface portion of the recessed portion is on the outside, whereby the battery terminal can be easily fixed (temporarily fixed) to the collector of the battery in the end on the first side in the shaft direction. Furthermore, the third metal layer is located in each of the end of the shaft portion coming into contact with the collector of the battery in the bent state and the inner circumferential surface portion of the recessed portion exposed outward, and hence when the battery terminal swaged to the collector of the battery is welded to the collector of the battery by laser welding or the like, the battery terminal can be easily welded to the collector of the battery even in the swaged state.

In this case, the thickness of the third metal layer in the end of the shaft portion is preferably larger than the thickness of the third metal layer in the inner circumferential surface portion of the recessed portion. Furthermore, the thickness of the third metal layer in the end of the shaft portion is more preferably at least twice the thickness of the third metal layer in the inner circumferential surface portion of the recessed portion. According to this structure, the thermal conductivity of the Ni-based alloy is smaller than the thermal conductivity of the Cu-based alloy, and hence heat generated during welding can be restrained from escaping from the third metal layer to the second metal layer by rendering the thickness of the third metal layer made of the Ni-based alloy in the end of the shaft portion larger. Consequently, the weldability of the battery terminal in the end of the shaft portion can be improved. Furthermore, the thickness of the third metal layer made of the Ni-based alloy is made smaller, whereby in the inner circumferential surface portion of the recessed portion coming into contact with a swaging jig when the battery terminal is swaged, frictional heat generated between the swaging jig and the inner circumferential surface portion of the recessed portion during swaging is allowed to promptly escape to the second metal layer. Thus, seizure of the swaging jig and the inner circumferential surface portion of the recessed portion due to the frictional heat can be significantly reduced.

In the aforementioned structure in which the shaft portion is provided with the recessed portion, in the inner circumferential surface portion of the recessed portion, the thickness of the third metal layer closer to an opening of the recessed portion is preferably larger than the thickness of the third metal layer closer to an inner bottom surface portion of the recessed portion. According to this structure, heat generated when the end of the shaft portion is welded can be effectively restrained from escaping to the second metal layer through the third metal layer closer to the opening by rendering the thickness of the third metal layer closer to the opening of the recessed portion near the end of the shaft portion larger. Thus, the weldability of the battery terminal can be further improved. Furthermore, the amount of the Ni-based alloy used can be reduced by rendering the thickness of the third metal layer closer to the inner bottom surface portion of the recessed portion smaller.

In the aforementioned structure in which the shaft portion is provided with the recessed portion, the third metal layer is preferably located in an inner bottom surface portion of the recessed portion in addition to the inner circumferential surface portion of the recessed portion, and the thickness of the third metal layer in the inner circumferential surface portion of the recessed portion is preferably smaller than the thickness of the third metal layer in the inner bottom surface portion of the recessed portion. According to this structure, in the inner circumferential surface portion of the recessed portion coming into contact with the swaging jig, the thickness of the third metal layer made of the Ni-based alloy can be rendered smaller, and hence the frictional heat generated between the swaging jig and the inner circumferential surface portion of the recessed portion during swaging is allowed to promptly escape to the second metal layer. Consequently, seizure of the swaging jig and the inner circumferential surface portion of the recessed portion due to the frictional heat can be significantly reduced.

In the aforementioned battery terminal according to the first aspect, in the end on the first side in the shaft direction, the thickness of the third metal layer in the shaft direction is preferably at least 20 μm. According to this structure, in the end on the first side in the shaft direction, the thickness of the third metal layer made of the Ni-based alloy can be sufficiently ensured, and hence heat generated during welding can be reliably restrained from escaping from the third metal layer to the second metal layer. Consequently, the weldability of the battery terminal in the end of the shaft portion can be further improved.

In the aforementioned battery terminal according to the first aspect, the clad material preferably further includes a reaction suppression layer arranged between the first metal layer and the second metal layer and configured to suppress reaction of the Al-based alloy of which the first metal layer is made and the Cu-based alloy of which the second metal layer is made. According to this structure, the reaction suppression layer can suppress generation of a fragile Al—Cu alloy as an intermetallic compound caused by the reaction of the Al-based alloy of which the first metal layer is made and the Cu-based alloy of which the second metal layer is made.

In the aforementioned battery terminal according to the first aspect, in the shaft direction, the thickness of the third metal layer in the end of the shaft portion is preferably smaller than the length of the first metal layer and the length of the second metal layer. According to this structure, the percentage of the first metal layer made of an Al base alloy, which is lighter than the third metal layer (Ni base alloy), can be increased, and the percentage of the second metal layer made of a Cu base alloy, which is more excellent in electrical conductivity than the third metal layer, can be increased. Consequently, in addition to advantages of improvement in corrosion resistance and facilitation of welding by the third metal layer, the battery terminal, which is lighter and more excellent in electrical conductivity, can be obtained.

In the aforementioned battery terminal according to the first aspect, the third metal layer is preferably located in a surface portion of the flange portion on the first side, and in the shaft direction, the thickness of the third metal layer in the end of the shaft portion on the first side is preferably larger than the thickness of the third metal layer in the surface portion of the flange portion on the first side. According to this structure, the third metal layer can be sufficiently ensured in the end of the shaft portion on the first side, and hence sufficient heat for welding can be easily generated in the end of the shaft portion on the first side when the battery terminal is welded to another member by laser welding or the like. Furthermore, when the flange portion is not welded to another member, an increase in the percentage of the unnecessary third metal layer can be significantly reduced by rendering the thickness of the third metal layer in the surface portion of the flange portion on the first side smaller.

In the aforementioned battery terminal according to the first aspect, the flange portion preferably radially expands from the shaft portion on a second side in the shaft direction, and the third metal layer is preferably located in the end on the first side of the shaft portion that protrudes from the flange portion. According to this structure, in the end of the protruding shaft portion on the first side, away from the flange portion, the battery terminal can be welded to another member, and hence the flange portion can be restrained from hindering welding to another member.

In the aforementioned battery terminal according to the first aspect, the flange portion preferably radially expands in the end of the shaft portion on the first side in the shaft direction, and the third metal layer preferably entirely covers a surface portion of the shaft portion on the first side and a surface portion of the flange portion on the first side. According to this structure, even if another member is a large flat plate-shaped member, another member can be reliably welded to the battery terminal by the third metal layer formed to entirely cover the surface portion of the shaft portion on the first side and the surface portion of the flange portion on the first side.

A method for manufacturing a battery terminal according to a second aspect of the present invention includes forming a clad material in which a first metal layer made of an Al-based alloy, a second metal layer made of a Cu-based alloy, and a third metal layer made of a Ni-based alloy are bonded to each other in a state where the first metal layer, the second metal layer, and the third metal layer are stacked in this order and pressing the clad material to form a shaft portion and a flange portion that radially expands from the shaft portion, and pressing the clad material includes pressing the clad material to locate the third metal layer at least in an end of the shaft portion on a first side in a shaft direction in which the shaft portion extends.

In the method for manufacturing a battery terminal according to the second aspect of the present invention, in addition to the aforementioned effects of the battery terminal according to the first aspect, the clad material is pressed to locate the third metal layer at least in the end of the shaft portion on the first side in the shaft direction in which the shaft portion extends. Thus, in addition to that no Ni plating processing is necessary, the battery terminal including the shaft portion and the flange portion and having the third metal layer located at least in the end on the first side in the shaft direction in which the shaft portion extends can be prepared only by pressing, and hence manufacturing steps for the battery terminal can be simplified.

In the aforementioned method for manufacturing a battery terminal according to the second aspect, pressing the clad material preferably further includes pressing the clad material to locate the third metal layer in an outer circumferential surface portion of the shaft portion in addition to the end on the first side in the shaft direction. According to this structure, corrosion of the second metal layer from the outer circumferential surface portion of the shaft portion can be significantly reduced, and the battery terminal can be easily welded to another member by laser welding or the like not only in the end of the battery terminal on the first side in the shaft direction, in which the third metal layer is provided, but also in the outer circumferential surface portion of the shaft portion.

In the aforementioned method for manufacturing a battery terminal according to the second aspect, pressing the clad material preferably further includes pressing the clad material to expose the second metal layer made of the Cu-based alloy on an outer edge of the flange portion on the first side in the shaft direction. According to this structure, the first side of the battery terminal in the shaft direction can be easily confirmed on the basis of the second metal layer exposed on the outer edge of the flange portion on the first side in the shaft direction. Thus, the first side of the battery terminal in the shaft direction can be easily confirmed by image inspection even when the manufacturing steps for the battery terminal are automated.

In the aforementioned method for manufacturing a battery terminal according to the second aspect, pressing the clad material preferably further includes pressing the clad material to locate the third metal layer in the end of the shaft portion and an inner circumferential surface portion of a recessed portion while forming the recessed portion in the shaft portion on a side bonded to a collector of a battery on the first side in the shaft direction. According to this structure, the battery terminal can be easily fixed (temporarily fixed) to another member (the collector of the battery) in the end on the first side in the shaft direction. Furthermore, the battery terminal can be easily welded to the collector of the battery even in the swaged state.

In the aforementioned method for manufacturing a battery terminal according to the second aspect, forming the clad material preferably includes forming the clad material such that the thickness of the third metal layer is smaller than the thickness of the first metal layer and the thickness of the second metal layer. According to this structure, the electrical conductivity of the battery terminal to be prepared can be improved by increasing the percentage of the second metal layer made of a Cu base alloy, which is excellent in electrical conductivity, and the weight of the battery terminal to be prepared can be reduced by increasing the percentage of the first metal layer made of an Al base alloy, which is lightweight. Furthermore, a reduction in the electrical conductivity of the battery terminal to be prepared can be significantly reduced by reducing the percentage of the third metal layer made of a Ni base alloy, which is less excellent in electrical conductivity than the Cu base alloy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

<Structure of Assembled Battery>

The structure of an assembled battery 100 according to a first embodiment of the present invention is now described with reference to FIGS. 1 to 6.

Figure 1:
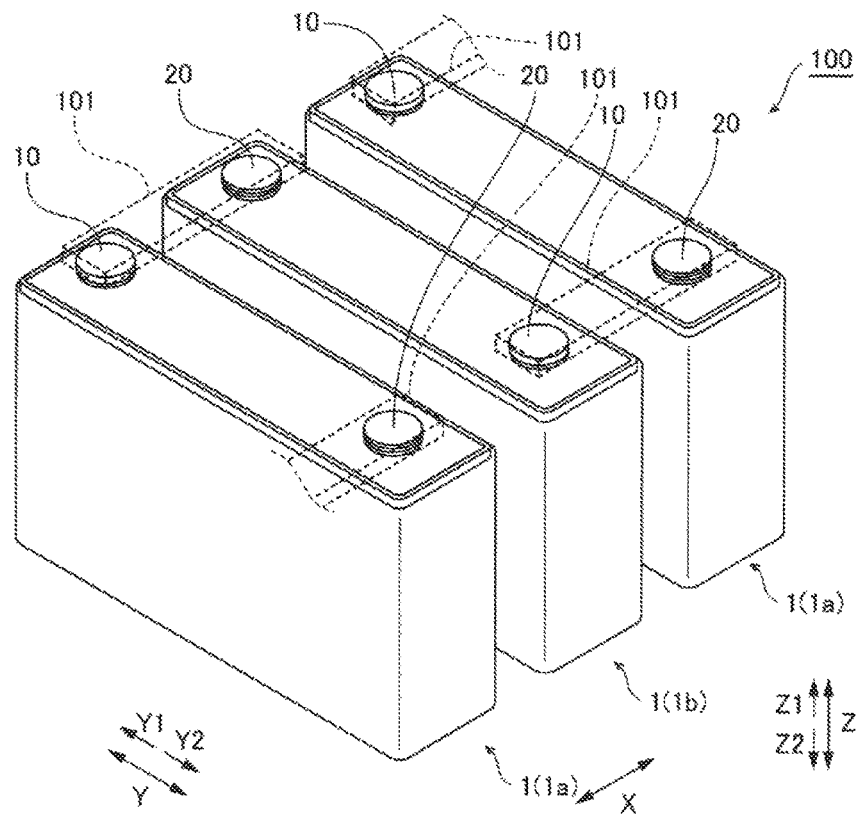
FIG. 1 is a perspective view showing an assembled battery according to a first embodiment of the present invention.

The assembled battery 100 according to the first embodiment of the present invention is a large-sized battery system employed in an electric vehicle (EV), a hybrid electric vehicle (HEV), a residential electric storage system, etc. This assembled battery 100 includes multiple lithium-ion batteries 1 electrically connected to each other by multiple flat plate-shaped bus bars 101 (shown by dotted lines), as shown in FIG. 1.

In the assembled battery 100, the multiple lithium-ion batteries 1 are aligned along the narrow width direction (direction X) of the lithium-ion batteries 1 in a plan view. Furthermore, in the assembled battery 100, lithium-ion batteries 1 (1a) in which positive-electrode terminals 10 are located on one side (Y1 side) in a wide width direction (direction Y) orthogonal to the narrow width direction while negative-electrode terminals 20 are located on the other side (Y2 side) in the direction Y and lithium-ion batteries 1 (1b) in which positive-electrode terminals 10 are located on the Y2 side while negative-electrode terminals 20 are located on the Y1 side are alternately arranged along the direction X.

Positive-electrode terminals 10 of prescribed lithium-ion batteries 1 are bonded to first ends in the direction X of the bus bars 101 of pure Al that extends in the direction X by resistance welding. Negative-electrode terminals 20 of lithium-ion batteries 1 adjacent to the prescribed lithium-ion batteries 1 are bonded to second ends in the direction X of the bus bars 101 of pure Al by resistance welding. Thus, the positive-electrode terminals 10 of the lithium-ion batteries 1 are connected to the negative-electrode terminals 20 of the lithium-ion batteries 1 adjacent thereto through the bus bars 101. In this manner, the assembled battery 100 in which the multiple lithium-ion batteries 1 are connected in series to each other is configured.

The bus bars 101 of pure Al are employed, whereby the weight of the bus bars 101 can be reduced so that the weight of the entire assembled battery 100 employing the multiple bus bars 101 can be reduced, as compared with the case where bus bars of pure Cu are employed. Pure Al denotes aluminum in No. A1000s of JIS (Japanese Industrial Standards), for example. Pure Cu denotes copper such as an oxygen-free copper, tough pitch copper, and phosphorus-deoxidized copper.

<Structure of Lithium-Ion Battery>

Figure 2:
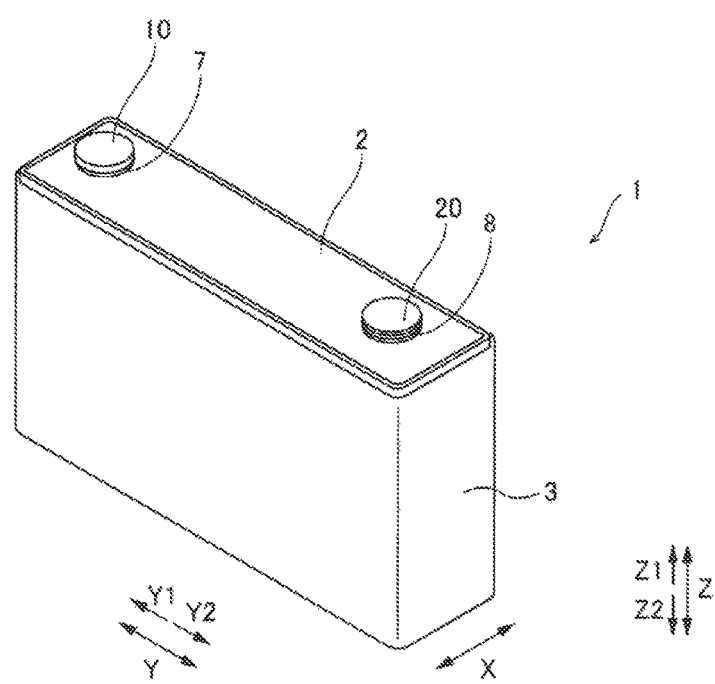
FIG. 2 is a perspective view showing the overall structure of a lithium-ion battery according to the first embodiment of the present invention.

Each of the lithium-ion batteries 1 has a substantially rectangular parallelepiped outer shape, as shown in FIG. 2. Each of the lithium-ion batteries 1 includes a cover member 2 arranged on one side (upper side; Z1 side) in a vertical direction (direction Z) orthogonal to the direction X and the direction Y and a battery case body 3 arranged on the other side (Z2 side) in the vertical direction. These cover member 2 and battery case body 3 each are made of a Ni-plated steel sheet.

Figure 3:
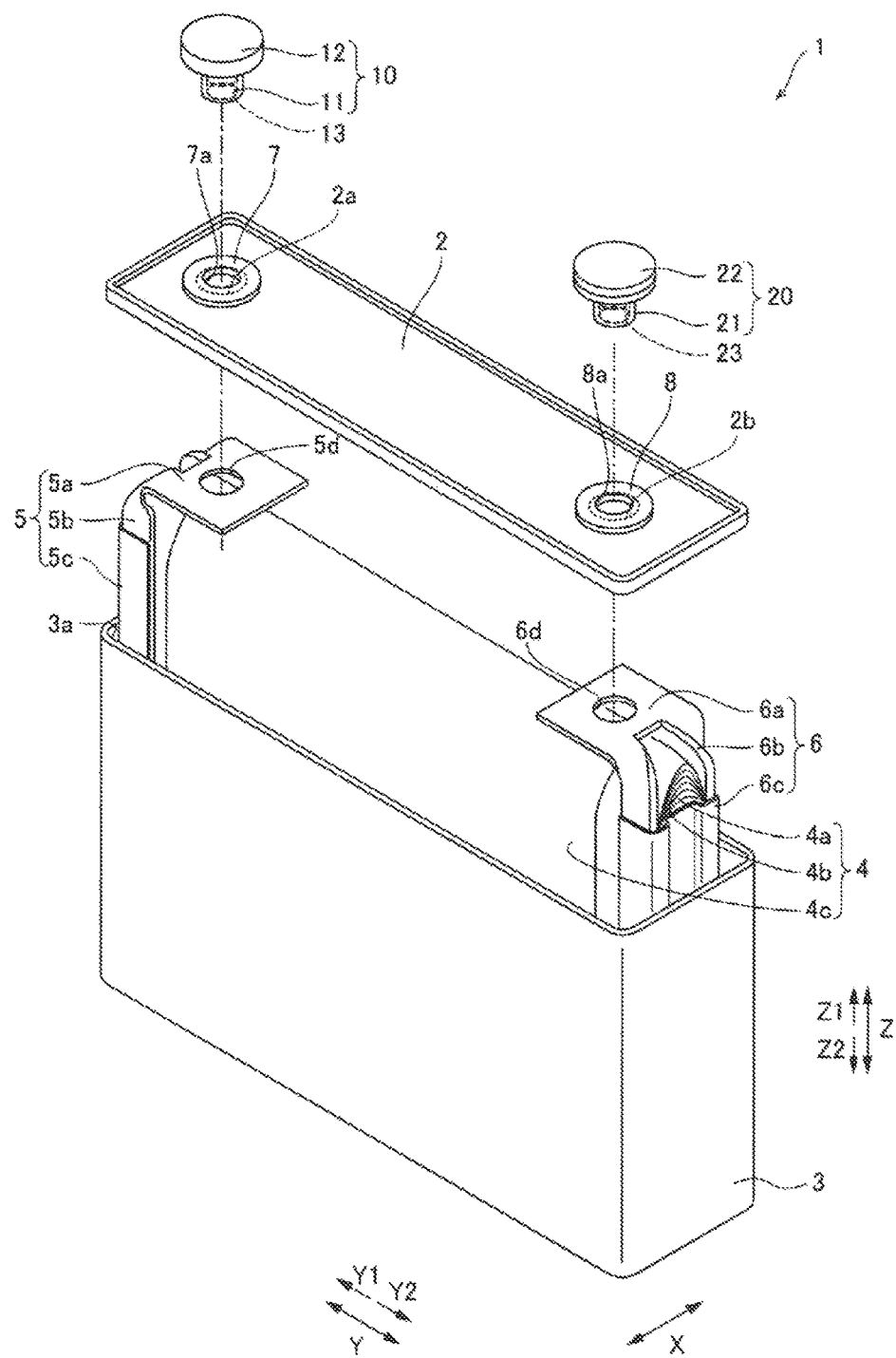
FIG. 3 is an exploded perspective view showing the overall structure of the lithium-ion battery according to the first embodiment of the present invention.

The cover member 2 is flat plate-shaped, as shown in FIG. 3. The cover member 2 is provided with a pair of insertion holes 2a and 2b that passes therethrough in the direction Z. The pair of insertion holes 2a and 2b is provided at a prescribed interval in the direction Y of the cover member 2, and are provided in a substantially central portion in the direction X of the cover member 2. Furthermore, a positive-electrode terminal 10 and a negative-electrode terminal 20 are inserted into the pair of insertion holes 2a and 2b, respectively.

Each of the lithium-ion batteries 1 includes a power generation element 4 in which a positive electrode 4a, a negative electrode 4b, and a separator 4c are stacked in a roll shape and an unshown electrolyte. The positive electrode 4a is made of Al foil to which a positive-electrode active material is applied. The negative electrode 4b is made of Cu foil to which a negative-electrode active material is applied. The separator 4c has a function of isolating the positive electrode 4a and the negative electrode 4b from each other.

Each of the lithium-ion batteries 1 includes a positive-electrode collector 5 that electrically connects the positive-electrode terminal 10 to the positive electrode 4a of the power generation element 4 and a negative-electrode collector 6 that electrically connects the negative-electrode terminal 20 to the negative electrode 4b of the power generation element 4. The positive-electrode collector 5 is arranged on the Y1 side in correspondence to the positive-electrode terminal 10. The positive-electrode collector 5 includes a connecting portion 5a provided with a hole 5d into which the positive-electrode terminal 10 is inserted, a leg portion 5b that extends to the Z2 side, and a connecting plate 5c that connects the leg portion 5b to the positive electrode 4a. The positive-electrode collector 5 is made of pure Al, similarly to the positive electrode 4a.

The negative-electrode collector 6 is arranged on the Y2 side in correspondence to the negative-electrode terminal 20. The negative-electrode collector 6 includes a connecting portion 6a provided with a hole 6d into which the negative-electrode terminal 20 is inserted, a leg portion 6b that extends to the Z2 side, and a connecting plate 6c that connects the leg portion 6b to the negative electrode 4b. The negative-electrode collector 6 is made of pure Cu, similarly to the negative electrode 4b.

Insulating packings 7 and 8 are fitted into the insertion holes 2a and 2b of the cover member 2, respectively. The packing 7 is provided with a hole 7a into which the positive-electrode terminal 10 is inserted. This packing 7 is arranged to prevent contact of the upper surface of the cover member 2 on the Z1 side and the internal surface of the insertion hole 2a with the positive-electrode terminal 10 and to prevent contact of the lower surface of the cover member 2 on the Z2 side with the positive-electrode collector 5. Similarly, the packing 8 is provided with a hole 8a into which the negative-electrode terminal 20 is inserted. The packing 8 is arranged to prevent contact of the upper surface of the cover member 2 on the Z1 side and the internal surface of the insertion hole 2b with the negative-electrode terminal 20 and to prevent contact of the lower surface of the cover member 2 on the Z2 side with the negative-electrode collector 6.

The positive-electrode terminal 10 includes a columnar shaft portion 11 that extends in the direction Z and an annular flange portion 12 that radially expands in an X-Y planar direction orthogonal to the direction Z from the shaft portion 11 in an end of the shaft portion 11 on the Z1 side.

The rivet-shaped positive-electrode terminal 10 is made of pure Al, similarly to the positive-electrode collector 5 and the bus bars 101. An end of the shaft portion 11 on the Z2 side is provided with a recessed portion 13 for swaging. The positive-electrode terminal 10 is swaged to the positive-electrode collector 5 in a state where the positive-electrode terminal 10 is inserted into the insertion hole 2a (the hole 7a of the packing 7) of the cover member 2 and the hole 5d of the positive-electrode collector 5, and is bonded to the positive-electrode collector 5 by laser welding in a state where the positive-electrode terminal 10 is swaged. In the positive-electrode terminal 10, pressing is performed on an unshown Al plate material so that the shaft portion 11, the flange portion 12, and the recessed portion 13 are formed.

(Structure of Negative-Electrode Terminal)

Figure 4:
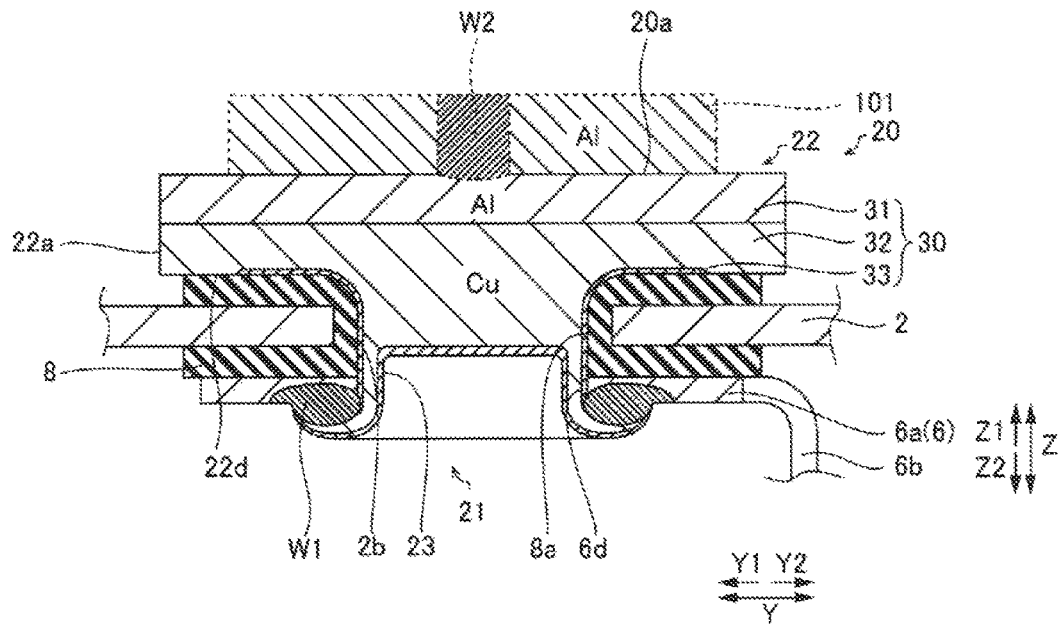
FIG. 4 is a sectional view showing a region around a negative-electrode terminal of the lithium-ion battery according to the first embodiment of the present invention.
Figure 5:
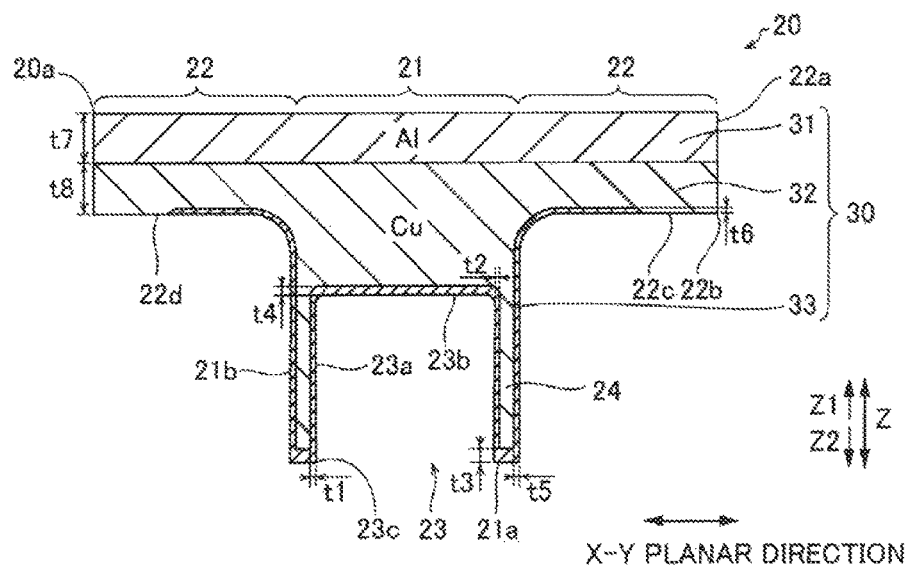
FIG. 5 is a sectional view showing the negative-electrode terminal according to the first embodiment of the present invention.

The negative-electrode terminal 20 has an outer shape similar to that of the positive-electrode terminal 10. In other words, the negative-electrode terminal 20 includes a columnar shaft portion 21 that extends in the direction Z and an annular flange portion 22 that radially expands in the X-Y planar direction from the shaft portion 21 in an end of the shaft portion 21 on the Z1 side, as shown in FIGS. 4 and 5. Consequently, the negative-electrode terminal 20 is rivet-shaped. The shaft portion 21 is located in a substantially central portion of the negative-electrode terminal 20 in the direction X and the direction Y. The shaft portion 21 and the flange portion 22 are substantially flush with each other on a surface portion 20a of the negative-electrode terminal 20 on the Z1 side, and the shaft portion 21 extends to the Z2 side to protrude from the flange portion 22. The negative-electrode terminal 20 is an example of the "battery terminal" in the claims. The direction Z is an example of the "shaft direction" in the claims, and the X-Y planar direction is an example of the "radiation direction" in the claims.

Figure 6:
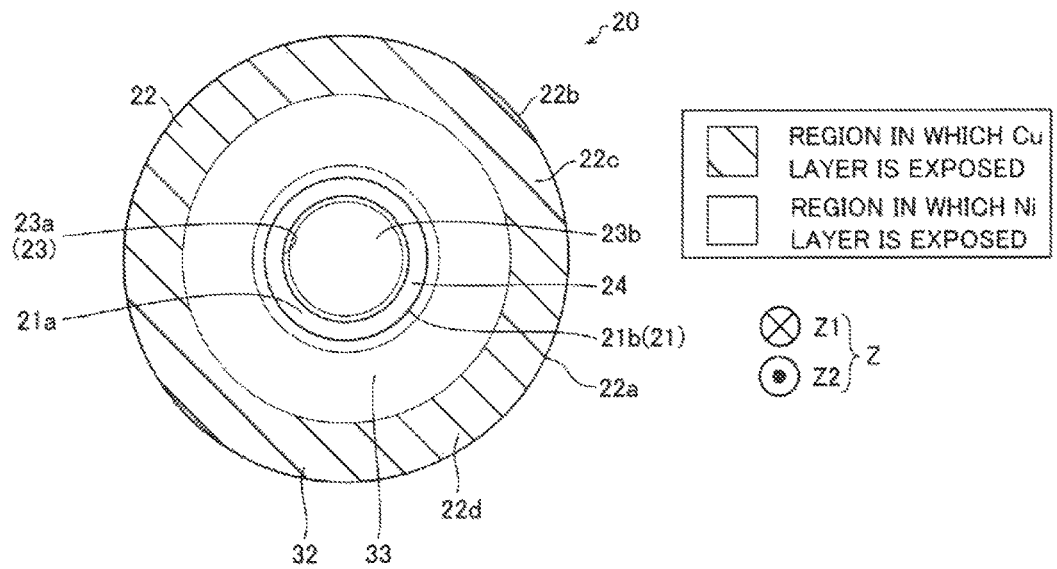
FIG. 6 is a diagram of the negative-electrode terminal according to the first embodiment of the present invention, as viewed from a Z2 side.

On the Z2 side of the shaft portion 21, a recessed portion 23 for swaging is provided. This recessed portion 23 is recessed from an end (tip) 21a on the Z2 side toward the Z1 side. The recessed portion 23 is circular in a plan view from the Z2 side, as shown in FIG. 6, and hence the Z2 side of the shaft portion 21 provided with the recessed portion 23 is cylindrical. In other words, the recessed portion 23 is provided in a region surrounded by a cylindrical wall portion 24 from the outside.

As shown in FIG. 4, the negative-electrode terminal 20 is swaged to the negative-electrode collector 6 in a state where the negative-electrode terminal 20 is inserted into the insertion hole 2b (the hole 8a of the packing 8) of the cover member 2 and the hole 6d of the negative-electrode collector 6, and is bonded to the negative-electrode collector 6 by laser welding in a state where the negative-electrode terminal 20 is swaged. Thus, each of the lithium-ion batteries 1 is provided with an annular weld portion W1 (a densely shaded region) that bonds the shaft portion 21 to the connecting portion 6a of the negative-electrode collector 6. The Z2 side is an example of the "first side in the shaft direction" or the "side bonded to a collector of a battery" in the claims.

According to the first embodiment, the negative-electrode terminal 20 is made of a three-layered clad material 30 in which an Al layer 31 of pure Al, a Cu layer 32 of pure Cu, and a Ni layer 33 of pure Ni are bonded to each other by rolling in a state where these are stacked in this order from the Z1 side, as shown in FIG. 5. Thus, on a bonded interface between the Al layer 31 and the Cu layer 32 cladded to each other, the Al layer 31 and the Cu layer 32 are atomically (chemically) bonded to each other, and on a bonded interface between the Cu layer 32 and the Ni layer 33 cladded to each other, the Cu layer 32 and the Ni layer 33 are atomically bonded to each other. Consequently, entry of extraneous material such as water to the interface between the Al layer 31 and the Cu layer 32 and the interface between the Cu layer 32 and the Ni layer 33 is effectively and significantly reduced. Pure Ni denotes nickel such as NW2200 or NW2201 defined in JIS (Japanese Industrial Standards). The Al layer 31, the Cu layer 32, and the Ni layer 33 are examples of the "first metal layer", the "second metal layer", and the "third metal layer" in the claims, respectively.

The thermal conductivity of the Ni layer 33 made of pure Ni is about 95 (W/K·m), and is smaller than the thermal conductivity (about 400 (W/K·m)) of the Cu layer 32 made of pure Cu. In other words, heat is more likely to be accumulated in the Ni layer 33 as compared with the Cu layer 32. The Ni layer 33 made of pure Ni is smaller in reflectivity for a laser beam of a fundamental wavelength (1064 nm) in laser welding than the Cu layer 32 made of pure Cu. In other words, when a laser beam is applied, the Ni layer 33 is more likely to absorb the laser beam as compared with the Cu layer 32, and hence the temperature is likely to increase during laser welding.

As shown in FIG. 5, the Al layer 31 is arranged on the Z1 sides of the shaft portion 21 and the flange portion 22, and is exposed on surfaces of the shaft portion 21 and the flange portion 22 on the Z1 side and on the Z1 side of a side end 22a of the flange portion 22. This Al layer 31 is bonded to a bus bar 101 by resistance welding in a state where the bus bar 101 is arranged on the Z1 side, as shown in FIG. 4. By the resistance welding, a weld portion W2 (a densely shaded region) is formed in a part of the Al layer 31 and the bus bar 101.

As shown in FIG. 5, the Cu layer 32 is arranged on the Z2 side beyond the Al layer 31 in the shaft portion 21 and the flange portion 22. As shown in FIG. 6, the Cu layer 32 is annularly exposed on an outer edge 22b of a surface portion 22d of the flange portion 22 on the Z2 side. As shown in FIG. 5, the Cu layer 32 is exposed on the Z2 side of the side end 22a of the flange portion 22.

The Ni layer 33 is arranged (located) on the Z2 side beyond the Z2 side beyond the Cu layer 32 in the shaft portion 21 and the flange portion 22. The Ni layer 33 is exposed on the substantially annular end 21a on the Z2 side and an outer circumferential surface portion 21b and on an inner circumferential surface portion 23a and a substantially circular inner bottom surface portion 23b of the recessed portion 23, of a protruding portion of the shaft portion 21 on the Z2 side. The Ni layer 33 is exposed in a substantially circular region inside the outer edge 22b of the surface portion 22d of the flange portion 22 on the Z2 side. As shown in FIG. 6, the Cu layer 32 is exposed on the outer edge 22b of the flange portion 22 on the Z2 side and in an exposed region 22c of the surface portion 22d of the flange portion 22 on the Z2 side, closer to the outer edge 22b. The Ni layer 33 is exposed in a region inside the exposed region 22c. The exposed region 22c in which the Cu layer 32 is exposed is annularly provided along the outer edge 22b.

As shown in FIG. 5, in the circumferential inner circumferential surface portion 23a of the recessed portion 23, the thickness t1 of the Ni layer 33 in the X-Y planar direction, closer to an opening 23c of the recessed portion 23, is larger than the thickness t2 of the Ni layer 33 in the X-Y planar direction, closer to the inner bottom surface portion 23b of the recessed portion 23. The thicknesses t1 and t2 are preferably at least about 2 µm and not more than about 20 µm, and more preferably at least about 2 µm and not more than about 3.5 µm.

According to the first embodiment, the thickness t3 of the Ni layer 33 in the direction Z in the end 21a of the shaft portion 21 on the Z2 side is larger than the thicknesses t1 and t2. The thickness t3 is larger than the thickness t4 of the Ni layer 33 in the direction Z in the inner bottom surface portion 23b of the recessed portion 23. Furthermore, the thickness t3 is larger than the thickness t5 of the Ni layer 33 in the X-Y planar direction in the outer circumferential surface portion 21b of the shaft portion 21 and the thickness t6 of the Ni layer 33 in the direction Z in the surface portion 22d of the flange portion 22 on the Z2 side. In other words, the thickness t3 of the Ni layer 33 in the direction Z in the end 21a of the shaft portion 21 on the Z2 side is the largest in the Ni layer 33. The thickness t3 is preferably at least about 20 µm, and more preferably at least about 25 µm. The thickness t3 is preferably at least about twice the thickness t1.

The thickness t7 of the Al layer 31 in the direction Z and the thickness t8 of the Cu layer 32 in the direction Z in the flange portion 22 are larger than the thickness t3 of the Ni layer 33 in the direction Z in the end 21a of the shaft portion 21 on the Z2 side. The thickness (length) of the Al layer 31 in the direction Z and the thickness (length) of the Cu layer 32 in the direction Z in the shaft portion 21 are larger than the thickness t3 of the Ni layer 33 in the direction Z in the end 21a of the shaft portion 21 on the Z2 side. Consequently, in the direction Z, the thickness of the Ni layer 33 is smaller than the length of the Al layer 31 and the length of the Cu layer 32. In other words, the thickness t8 is substantially equal to the thickness t7, or slightly larger than the thickness t7.

(Method for Manufacturing Negative-Electrode Terminal)

A method for manufacturing the negative-electrode terminal 20 according to the first embodiment is now described with reference to FIGS. 5 and 7 to 9.

Figure 7:
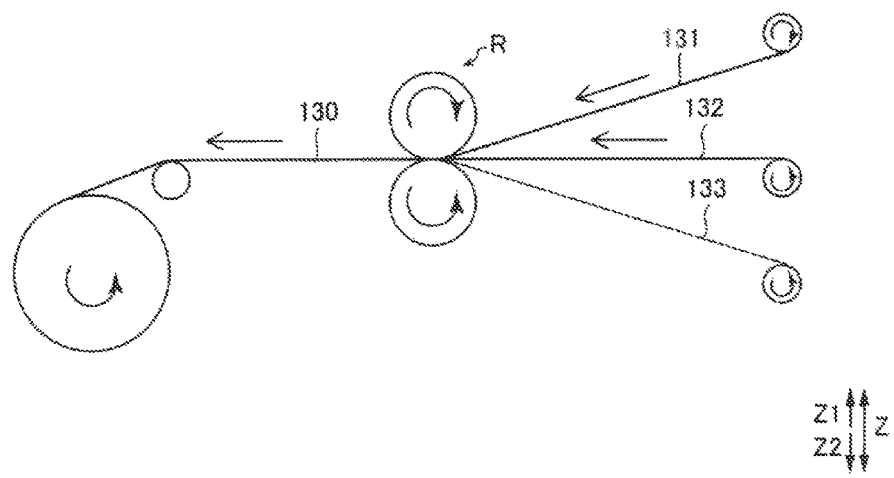
FIG. 7 is a schematic view for illustrating a method for manufacturing the negative-electrode terminal according to the first embodiment of the present invention.

First, an Al plate material 131 made of pure Al, a Cu plate material 132 made of pure Cu, and a Ni plate material 133 made of pure Ni are prepared, as shown in FIG. 7. The Al plate material 131, the Cu plate material 132, and the Ni plate material 133 are continuously rolled at a prescribed rolling reduction by rollers R in a state where these are stacked in this order from the Z1 side. Thus, a three-layered clad plate material 130 in which the Al layer 31, the Cu layer 32, and the Ni layer 33 (see FIG. 8) are bonded to each other in a state where these are stacked in this order is prepared. The thickness t11 (see FIG. 8) of the Ni layer 33 in the direction Z in the clad plate material 130 is smaller than the thickness t12 (see FIG. 8) of the Al layer 31 in the direction Z and the thickness t13 (see FIG. 8) of the Cu layer 32 in the direction Z.

Then, the clad plate material 130 is held for a prescribed time in a prescribed temperature environment so that diffusion annealing is performed thereon. Thus, on the interface between the Al layer 31 and the Cu layer 32 bonded to each other and the interface between the Cu layer 32 and the Ni layer 33 bonded to each other, bonding strength between the layers is increased.

Figure 8:
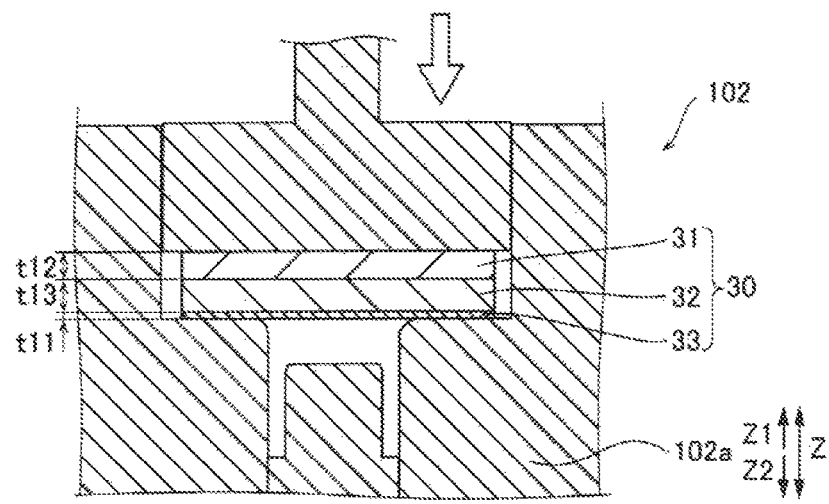
FIG. 8 is another schematic view for illustrating the method for manufacturing the negative-electrode terminal according to the first embodiment of the present invention.
Figure 9:
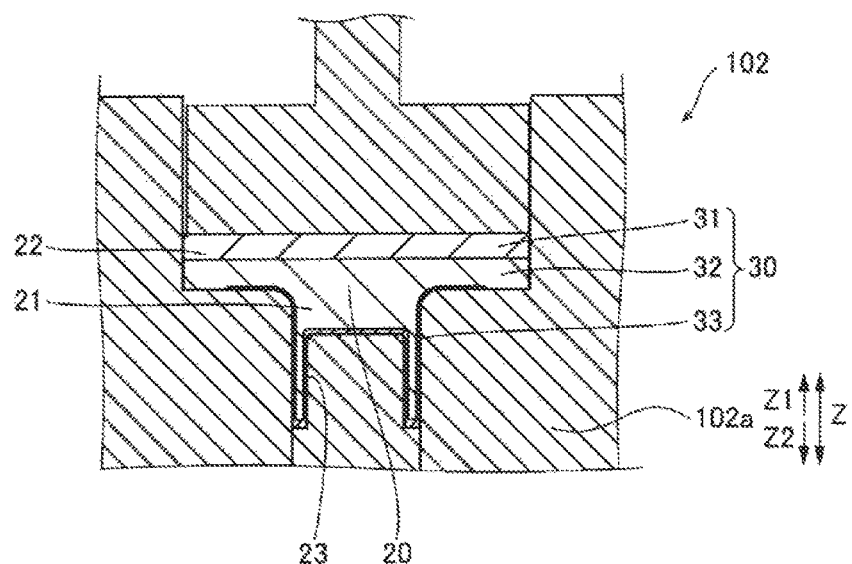
FIG. 9 is another schematic view for illustrating the method for manufacturing the negative-electrode terminal according to the first embodiment of the present invention.

Then, the clad plate material 130 is punched into a prescribed disc shape, whereby the clad material 30 is formed. Then, the clad material 30 is pressed, as shown in FIG. 8. Specifically, the punched clad material 30 is arranged in a mold 102a of a pressing machine 102. This mold 102a has an inner shape corresponding to the shapes of the shaft portion 21, the flange portion 22, and the recessed portion 23 (see FIG. 9). Then, as shown in FIG. 9, a pressure is applied from the Z1 side so that the clad material 30 is pressed. By this pressing, the Cu layer 32 and the Ni layer 33 are moved toward the Z2 side to form the shaft portion 21. Pure Cu of which the Cu layer 32 is made is likely to deform, and hence the Cu layer 32 moves to surround the Ni layer 33 from the outside (a side opposite to the shaft portion 21) on the surface portion 22d of the flange portion 22 on the Z2 side. Thus, the negative-electrode terminal 20 in which the shaft portion 21, the flange portion 22, and the recessed portion 23 are formed is prepared, as shown in FIG. 5. At this time, the Ni layer 33 is located in the end 21a of the shaft portion 21 on the Z2 side (a side bonded to the negative-electrode collector 6 of the lithium-ion battery 1), the outer circumferential surface portion 21b of the shaft portion 21, and the inner circumferential surface portion 23a of the recessed portion 23, and the Cu layer 32 is exposed on the outer edge 22b of the flange portion 22 on the Z2 side and in the exposed region 22c of the surface portion 22d of the flange portion 22 on the Z2 side.

(Steps of Welding Negative-Electrode Terminal)

Steps of welding the negative-electrode terminal 20 to the negative-electrode collector 6 according to the first embodiment are now described with reference to FIGS. 4 and 10 to 13.

Figure 10:
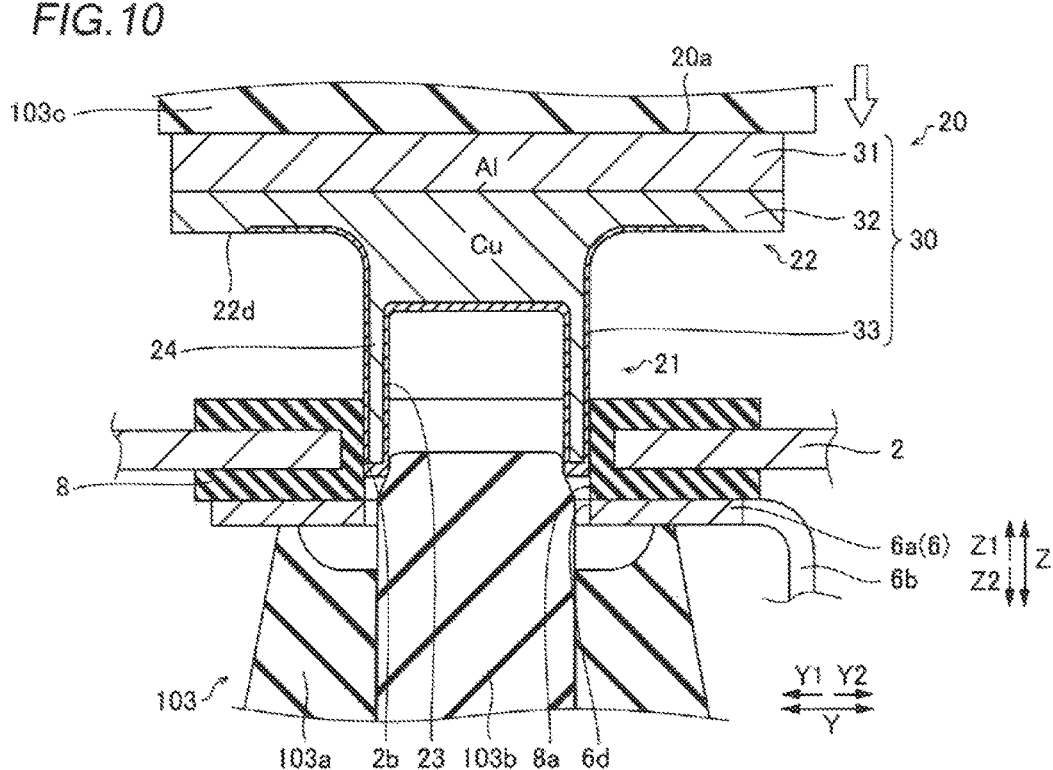
FIG. 10 is a sectional view showing a state before swaging of the negative-electrode terminal according to the first embodiment of the present invention.

First, the cover member 2 in which the packing 8 is fitted into the insertion hole 2b is prepared, as shown in FIG. 10. Then, the connecting portion 6a of the negative-electrode collector 6 is brought into contact with the surface of the cover member 2 on the Z2 side. In that state, a fixture member 103a of a swaging jig 103 is brought into contact with and fixed to a surface of the negative-electrode collector 6 on the Z2 side. In that state, a rod-like member 103b of the swaging jig 103 is inserted into the insertion hole 2b (the hole 8a of the packing 8) from the Z2 side. Then, an end of the inserted rod-like member 103b on the Z1 side is fitted into the recessed portion 23 of the negative-electrode terminal 20.

Figure 11:
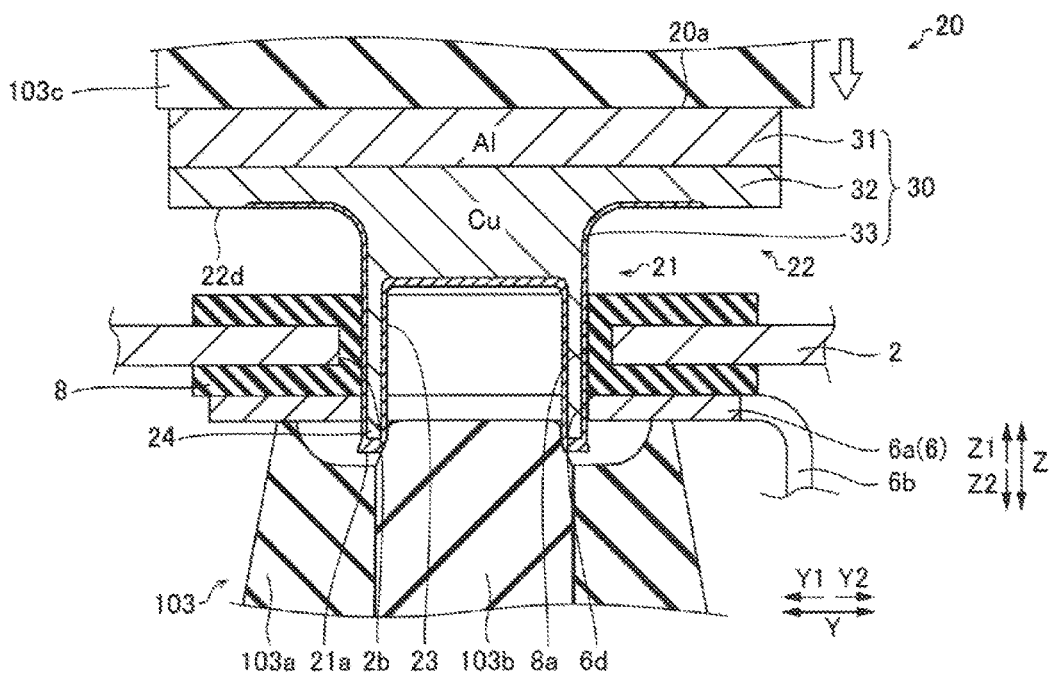
FIG. 11 is a sectional view showing a state during swaging of the negative-electrode terminal according to the first embodiment of the present invention.
Figure 12:
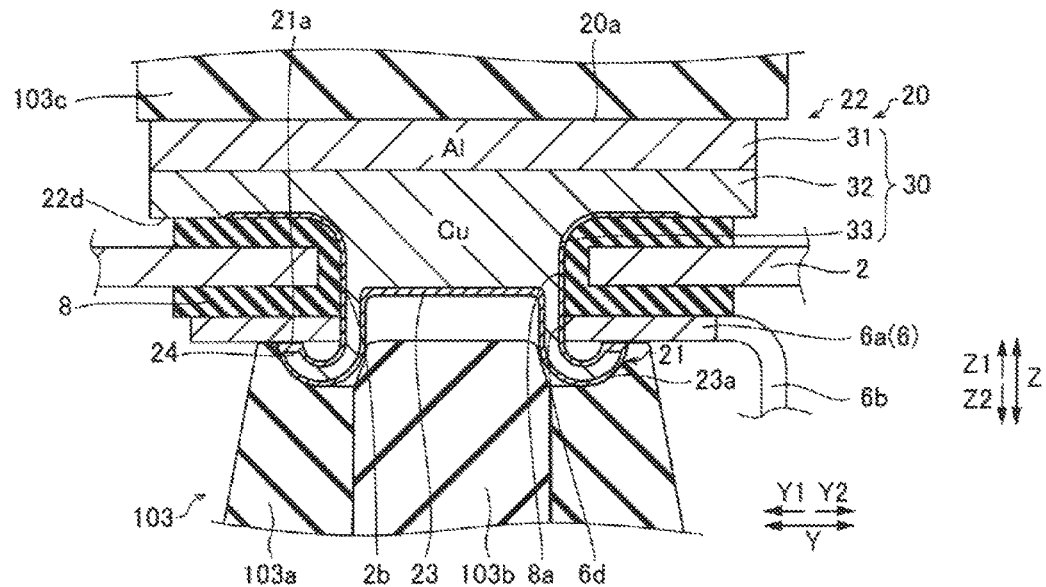
FIG. 12 is a sectional view showing a state after completion of swaging of the negative-electrode terminal according to the first embodiment of the present invention.

Then, the negative-electrode terminal 20 is pressed from the Z1 side by a pressing member 103c of the swaging jig 103. Thus, the negative-electrode terminal 20 moves toward the Z2 side together with the rod-like member 103b. Then, when the negative-electrode terminal 20 is moved until the end 21a of the negative-electrode terminal 20 on the Z2 side is located on the Z2 side beyond the insertion hole 2b, as shown in FIG. 11, the movement of the rod-like member 103b is stopped. Thus, by the pressing force of the pressing member 103c, the negative-electrode terminal 20 is moved along arrow Z2 while the cylindrical wall portion 24 of the negative-electrode terminal 20 is deformed along the outer peripheral surface of the rod-like member 103b. Then, the wall portion 24 of the negative-electrode terminal 20 is bent along the fixture member 103a of the swaging jig 103. Thus, the wall portion 24 is bent so that the section thereof becomes semicircular, as shown in FIG. 12, whereby the negative-electrode terminal 20 is swaged to the negative-electrode collector 6.

In the swaged state, the end 21a of the shaft portion 21 of the negative-electrode terminal 20 on the Z2 side, in which the Ni layer 33 is located, comes into contact with the negative-electrode collector 6. Furthermore, the inner circumferential surface portion 23a of the recessed portion 23 of the negative-electrode terminal 20, in which the Ni layer 33 is located, is exposed outward.

Figure 13:
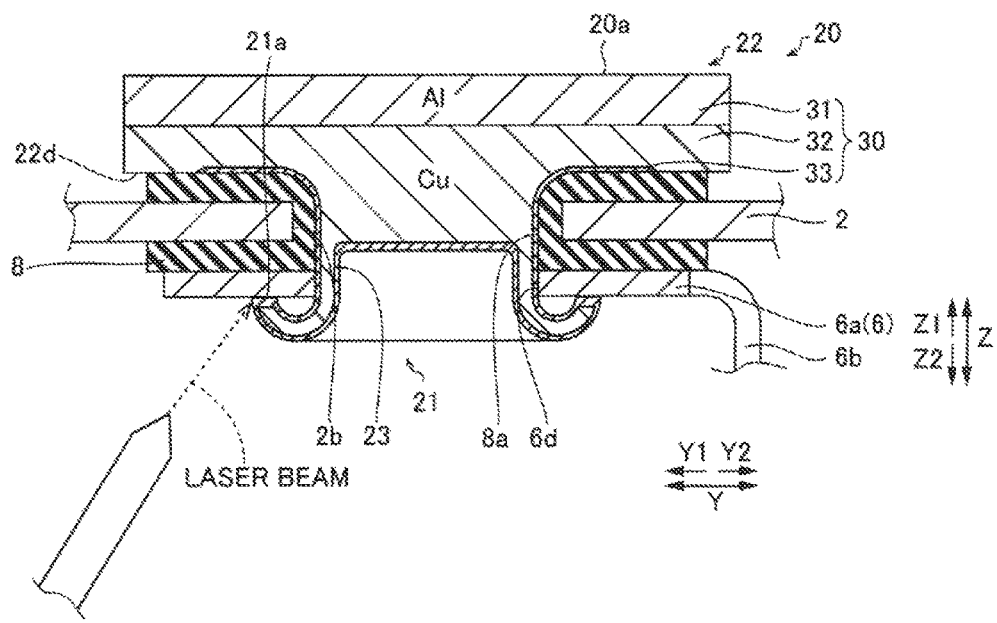
FIG. 13 is a sectional view showing the state of the negative-electrode terminal according to the first embodiment of the present invention during laser welding.

Then, in the swaged state, the negative-electrode terminal 20 and the negative-electrode collector 6 are welded to each other by laser welding, as shown in FIG. 13. At this time, the Ni layer 33 is located in the end 21a of the shaft portion 21 and the inner circumferential surface portion 23a of the recessed portion 23 around the end 21a of the negative-electrode terminal 20, and hence heat generated by a laser beam is unlikely to diffuse while the laser beam is efficiently absorbed. Consequently, pure Ni of the Ni layer 33 is efficiently melted in the end 21a of the shaft portion 21 and around the end 21a so that laser welding is efficiently performed. A swaged portion of the negative-electrode terminal 20 is circumferentially welded to be bonded, whereby the Z2 side, which is the side bonded to the negative-electrode collector 6 of the lithium-ion battery 1 of the negative-electrode terminal 20, is bonded to the negative-electrode collector 6, as shown in FIG. 4.

Effects of First Embodiment

According to the first embodiment, the following effects can be obtained.

According to the first embodiment, as hereinabove described, the negative-electrode terminal 20 is made of the clad material 30 in which the Al layer 31 of pure Al, the Cu layer 32 of pure Cu, and the Ni layer 33 of pure Ni are bonded to each other in the state where these are stacked in this order. Thus, the metal layers are not bonded to each other in physical contact with each other, but are atomically (chemically) bonded to each other by inter-diffusion of metal atoms resulting from clad bonding, and hence entry of water or the like to the interfaces can be significantly reduced. Thus, occurrence of corrosion on the interfaces between the metal layers bonded to each other can be significantly reduced. Furthermore, the negative-electrode terminal 20 has the Ni layer 33 made of pure Ni at least in the end 21a of the shaft portion 21 on the first side (Z2 side) in the shaft direction (direction Z) in which the shaft portion 21 extends. Thus, as compared with the case where only the Cu layer 32 made of pure Cu is located in the end 21a of the shaft portion 21 on the Z2 side, the negative-electrode terminal 20 can be easily welded to the negative-electrode collector 6 by laser welding.

According to the first embodiment, the clad material 30 including the Ni layer 33 made of pure Ni is employed, whereby no step for Ni plating processing is necessary, and hence complication of manufacturing steps for the negative-electrode terminal 20 can be significantly reduced.

According to the first embodiment, the clad material 30 is pressed to have the Ni layer 33 in the end 21a of the shaft portion 21 on the Z2 side of the negative-electrode terminal 20. Thus, in addition to that no Ni plating processing is necessary, the negative-electrode terminal 20 including the shaft portion 21 and the flange portion 22 and having the Ni layer 22 in the end 21a on the Z2 side can be prepared only by pressing, and hence the manufacturing steps for the negative-electrode terminal 20 can be simplified.

According to the first embodiment, the negative-electrode terminal 20 has the Ni layer 22 in the outer circumferential surface portion 21b of the shaft portion 21. Thus, pure Ni having a higher corrosion resistance than pure Cu is located in the outer circumferential surface portion 21b of the shaft portion 21 so that corrosion of the Cu layer 32 from the outer circumferential surface portion 21b of the shaft portion 21 can be significantly reduced. Furthermore, the negative-electrode terminal 20 can be easily welded to the negative-electrode collector 6 by laser welding not only in the end 21a of the negative-electrode terminal 20 on the Z2 side, in which the Ni layer 33 is provided, but also in the outer circumferential surface portion 21b of the shaft portion 21.

According to the first embodiment, the Cu layer 32 is exposed on the outer edge 22b of the flange portion 22 on the Z2 side. Thus, the Cu layer 32 made of pure Cu has a color close to red unlike pure Al and pure Ni, and hence the Z2 side of the negative-electrode terminal 20 can be easily confirmed on the basis of the Cu layer 32 exposed on the outer edge 22b of the flange portion 22 on the Z2 side. Consequently, the Z2 side of the negative-electrode terminal 20 can be easily confirmed by image inspection even when the manufacturing steps for the negative-electrode terminal 20 are automated.

According to the first embodiment, the exposed region 22c on which the Cu layer 32 is annularly exposed along the outer edge 22b of the flange portion 22 is provided in the negative-electrode terminal 20 on the Z2 side. Thus, by the annular exposure of the Cu layer 32, an exposed portion of the Cu layer 32 can be effectively restrained from hiding behind the shaft portion 21 etc. so that the same cannot be confirmed, and hence the Z2 side of the negative-electrode terminal 20 can be easily and reliably confirmed.

According to the first embodiment, the negative-electrode terminal 20 has the Ni layer 33 in the end 21a of the shaft portion 21 on the Z2 side (the side bonded to the negative-electrode collector 6 of the lithium-ion battery 1) and the inner circumferential surface portion 23a of the recessed portion 23. Thus, the negative-electrode terminal 20 is swaged to the negative-electrode collector 6 by bending the recessed portion 23 such that the inner circumferential surface portion 23a of the recessed portion 23 is on the outside, whereby the negative-electrode terminal 20 can be easily fixed (temporarily fixed) to the negative-electrode collector 6 by swaging on a side closer to the end 21a of the shaft portion 21 on the Z2 side. Furthermore, the Ni layer 33 is located in each of the end 21a of the shaft portion 21 coming into contact with the negative-electrode collector 6 in the bent state and the inner circumferential surface portion 23a of the recessed portion 23 exposed outward, and hence when the negative-electrode terminal 20 swaged to the negative-electrode collector 6 is welded to the negative-electrode collector 6 by laser welding, the negative-electrode terminal 20 can be easily welded to the negative-electrode collector 6 even in the swaged state.

According to the first embodiment, the thickness t3 of the Ni layer 33 in the end 21a of the shaft portion 21 is rendered larger than the thicknesses t1 and t2 of the Ni layer 33 in the inner circumferential surface portion 23a of the recessed portion 23. Preferably, the thickness t3 is at least about twice the thickness t1. Thus, the thermal conductivity of pure Ni is smaller than the thermal conductivity of pure Cu, and hence heat generated during welding can be restrained from escaping from the Ni layer 33 to the Cu layer 32 by rendering the thickness t3 of the Ni layer 33 made of pure Ni in the end 21a of the shaft portion 21 larger. Consequently, the weldability of the negative-electrode terminal 20 in the end 21a of the shaft portion 21 can be improved. Furthermore, the thicknesses t1 and t2 of the Ni layer 33 made of pure Ni is made smaller. Thus, in the inner circumferential surface portion 23a of the recessed portion 23 coming into contact with the fixture member 103a and the rod-like member 103b of the swaging jig 103 when the negative-electrode terminal 20 is swaged, frictional heat generated between the swaging jig 103 and the inner circumferential surface portion 23a of the recessed portion 23 during swaging is allowed to promptly escape to the Cu layer 32. Thus, seizure of the swaging jig 103 and the inner circumferential surface portion 23a of the recessed portion 23 due to the frictional heat can be significantly reduced.

According to the first embodiment, in the inner circumferential surface portion 23a of the recessed portion 23, the thickness t1 of the Ni layer 33 closer to the opening 23c of the recessed portion 23 is rendered larger than the thickness t2 of the Ni layer 33 closer to the inner bottom surface portion 23b of the recessed portion 23. Thus, heat generated when the end 21a of the shaft portion 21 is welded can be effectively restrained from escaping to the Cu layer 32 through the Ni layer 33 closer to the opening 23c by rendering the thickness t1 of the Ni layer 33 closer to the opening 23c of the recessed portion 23 near the end 21a of the shaft portion 21 larger. Thus, the weldability of the negative-electrode terminal 20 can be further improved. Furthermore, the amount of pure Ni used can be reduced by rendering the thickness t2 of the Ni layer 33 closer to the inner bottom surface portion 23b of the recessed portion 23 smaller.

According to the first embodiment, the thicknesses t1 and t2 of the Ni layer 33 in the inner circumferential surface portion 23a of the recessed portion 23 are rendered smaller the thickness t4 of the Ni layer 33 in the inner bottom surface portion 23b of the recessed portion 23. Thus, in the inner circumferential surface portion 23a of the recessed portion 23 coming into contact with the swaging jig 103, the thicknesses t1 and t2 of the Ni layer 33 made of pure Ni can be reliably rendered smaller, and hence the frictional heat generated between the swaging jig 103 and the inner circumferential surface portion 23a of the recessed portion 23 during swaging is allowed to promptly escape to the Cu layer 32. Consequently, seizure of the swaging jig 103 and the inner circumferential surface portion 23a of the recessed portion 23 due to the frictional heat can be significantly reduced.

According to the first embodiment, the thickness t3 of the Ni layer 33 in the direction Z in the end 21a on the Z2 side is set to at least about 20 μm. Thus, in the end 21a on the Z2 side, the thickness of the Ni layer 33 made of pure Ni can be sufficiently ensured, and hence heat generated in the Ni layer 33 during welding can be reliably restrained from escaping to the Cu layer 32. Consequently, the weldability of the negative-electrode terminal 20 in the end 21a on the Z2 side can be further improved.

According to the first embodiment, in the shaft direction (direction Z), the thickness t3 of the Ni layer 33 in the end 21a of the shaft portion 21 on the Z1 side is rendered smaller than the thickness t7 of the Al layer 31 and the thickness t8 of the Cu layer 32. Thus, the percentage of the Al layer 31 made of an Al base alloy, which is lighter than the Ni layer 33 (Ni base alloy), can be increased, and the percentage of the Cu layer 32 made of a Cu base alloy, which is more excellent in electrical conductivity than the Ni layer 33, can be increased. Consequently, in addition to advantages of improvement in corrosion resistance and facilitation of welding by the Ni layer 33, the negative-electrode terminal 20, which is lighter and more excellent in electrical conductivity, can be obtained.

According to the first embodiment, in the direction Z, the thickness t3 of the Ni layer 33 in the end 21a of the shaft portion 21 on the Z2 side is rendered larger than the thickness t6 of the Ni layer 33 in the surface portion 22d of the flange portion 22 on the Z2 side. Thus, the Ni layer 33 can be sufficiently ensured in the end 21a of the shaft portion 21 on the Z2 side, and hence sufficient heat for welding can be easily generated in the end 21a of the shaft portion 21 on the Z2 side when the negative-electrode terminal 20 is welded to another member by laser welding or the like. Furthermore, the flange portion 22 is not welded to another member, whereby an increase in the percentage of the unnecessary Ni layer 33 can be significantly reduced by rendering the thickness t6 of the Ni layer 33 in the surface portion 22d of the flange portion 22 on the Z2 side smaller.

According to the first embodiment, the flange portion 22 is provided on the Z1 side to radially expand from the shaft portion 21, and the Ni layer 33 is located in the end 21a on the Z2 side of the shaft portion 21 protruding from the flange portion 22. Thus, in the end 21a of the protruding shaft portion 21 on the Z2 side, away from the flange portion 22, the negative-electrode terminal 20 can be welded to the negative-electrode collector 6, and hence the flange portion 22 can be restrained from hindering welding to the negative-electrode collector 6.

According to the first embodiment, in the steps for preparing the clad material 30, the thickness t11 of the Ni layer 33 in the direction Z is rendered smaller than the thickness t12 of the Al layer 31 in the direction Z and the thickness t13 of the Cu layer 32 in the direction Z. Thus, the electrical conductivity of the negative-electrode terminal 20 to be prepared can be improved by increasing the percentage of the Cu layer 32 made of pure Cu, which is excellent in electrical conductivity, and the weight of the negative-electrode terminal 20 to be prepared can be reduced by increasing the percentage of the Al layer 31 made of pure Al, which is lightweight. Furthermore, a reduction in the electrical conductivity of the negative-electrode terminal 20 to be prepared can be significantly reduced by reducing the percentage of the Ni layer 33 made of pure Ni, which is less excellent in electrical conductivity than pure Cu.

Examples

Results of pressing for preparing the negative-electrode terminal 20 according to the first embodiment and measurement results for the thickness of the Ni layer 33 of the negative-electrode terminal 20 are now described with reference to FIGS. 7 to 9, 14, and 15.

First, similarly to the aforementioned manufacturing method according to the first embodiment, clad materials 30 before pressing according to Examples 1 to 3 were prepared. At this time, clad plate materials 130 (see FIG. 7) were formed by rolling at a rolling reduction of 60% during rolling, and the clad plate materials 130 after rolling are held for three hours in a temperature environment of 500° C., whereby diffusion annealing was performed. Then, the clad plate materials 130 were punched into a prescribed disc shape, whereby the clad materials 30 before pressing according to Examples 1 to 3 were prepared.

At this time, in the clad material 30 before pressing according to Example 1, the thickness t12 (see FIG. 8) of an Al layer 31, the thickness t13 (see FIG. 8) of a Cu layer 32, and the thickness t11 (see FIG. 8) of a Ni layer 33 were set to 1.62 mm, 1.85 mm, and 25 μm, respectively. In the clad material 30 before pressing according to Example 2, the thickness t12 of an Al layer 31, the thickness t13 of a Cu layer 32, and the thickness t11 of a Ni layer 33 were set to 1.61 mm, 1.84 mm, and 50 μm, respectively. In the clad material 30 before pressing according to Example 3, the thickness t12 of an Al layer 31, the thickness t13 of a Cu layer 32, and the thickness t11 of a Ni layer 33 were set to 1.59 mm, 1.81 mm, and 100 μm, respectively. The total thickness of the clad material 30 before pressing according to each of Examples 1 to 3 was set to 3.5 mm.

Then, similarly to the aforementioned first embodiment, pressing was performed by a pressing machine 102 (see FIGS. 8 and 9) shown in FIGS. 8 and 9. Thus, negative-electrode terminals 20 according to Examples 1 to 3 were prepared.

As Comparative Example, a battery terminal according to Comparative Example was prepared by pressing in a state where a disc-like Al plate material made of pure Al, a disc-like Cu plate material made of pure Cu, and a disc-like Ni plate material made of pure Ni were stacked in this order. In other words, according to Comparative Example, no clad material was prepared, but pressing was performed. At this time, the thickness of the Al plate material, the thickness of the Cu plate material, and the thickness of the Ni plate material were set to 1.7 mm, 2.0 mm, and 100 μm, respectively.

As results of pressing, according to Comparative Example, in addition to that the Al plate material and the Cu plate material were not integrated, a part of the plate material was seized to a mold 102a (see FIG. 8) of a pressing machine 102. On the other hand, according to each of Examples 1 to 3, a state where the Al layer 31 and the Cu layer 32 were integrated was maintained, and the negative-electrode terminal 20 was not seized to a mold 102a. Thus, it has been confirmable that a clad material 30 is preferably formed by rolling in a state where the Al layer 31, the Cu layer 32, and the Ni layer 33 are stacked, and the formed clad material 30 is preferably pressed, as in the aforementioned first embodiment.

Figures 14, 15:
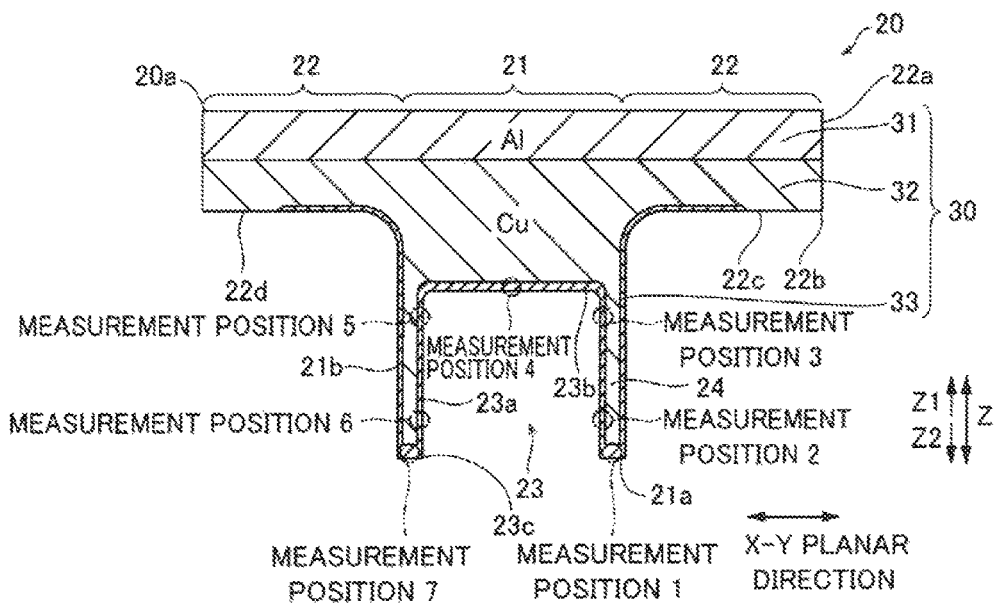
FIG. 14 is a sectional view for illustrating measurement positions in Examples of the first embodiment of the present invention.
FIG. 15 is a table showing measurement results in Examples of the first embodiment of the present invention.

As shown in FIG. 14, the negative-electrode terminal 20 after pressing according to each of Examples 1 to 3 was cut in a X-Z plane, and polished in a state where the same was embedded in resin. Then, the section of the negative-electrode terminal 20 of each of Examples 1 to 3 was observed by a microscope. At this time, the thickness of the Ni layer 33 at each of measurement positions 1 to 7 in the section of the negative-electrode terminal 20 according to each of Examples 1 to 3 was measured. Specifically, the thickness t3 of the Ni layer 33 in an end 21a (the measurement positions 1 and 7) of a shaft portion 21 on a Z2 side was measured. Furthermore, the thickness t1 of the Ni layer 33 closer to an opening 23c (the measurement positions 2 and 6) of an inner circumferential surface portion 23a of a recessed portion 23 was measured. Furthermore, the thickness t2 of the Ni layer 33 closer to an inner bottom surface portion 23b (the measurement positions 3 and 5) of the inner circumferential surface portion 23a of the recessed portion 23 was measured. Furthermore, the thickness t4 of the Ni layer 33 in the inner bottom surface portion 23b (the measurement position 4) of the recessed portion 23 was measured. In addition, at each of the measurement positions 1 to 7, five-point measurement was performed at pitches of 20 μm. Then, an average value of measurement values at the five points was set as the thickness of the Ni layer 33 at each of the measurement positions 1 to 7. The section of the battery terminal according to Comparative Example was not observed.

As the measurement results for the thickness shown in FIG. 15, in the negative-electrode terminal 20 of each of Examples 1 to 3, the thickness t3 of the Ni layer 33 in the end 21a (the measurement positions 1 and 7) of the shaft portion 21 on the Z2 side became larger than 25 μm. On the other hand, the thickness of the Ni layer 33 closer to the opening 23c (the measurement positions 2 and 6) of the inner circumferential surface portion 23a of the recessed portion 23, the thickness of the Ni layer 33 closer to the inner bottom surface portion 23b (the measurement positions 3 and 5) of the inner circumferential surface portion 23a of the recessed portion 23, and the thickness of the Ni layer 33 in the inner bottom surface portion 23b (the measurement position 4) of the recessed portion 23 became smaller than 25 μm, and hence these became smaller than the thickness of the Ni layer 33 in the end 21a of the shaft portion 21 on the Z2 side.

Furthermore, in the negative-electrode terminal 20 according to each of Examples 1 to 3, the thickness t1 of the Ni layer 33 closer to the opening 23c (the measurement positions 2 and 6) of the inner circumferential surface portion 23a of the recessed portion 23 became larger than the thickness t2 of the Ni layer 33 closer to inner bottom surface portion 23b (the measurement positions 3 and 5) of the inner circumferential surface portion 23a of the recessed portion 23.

In addition, in the negative-electrode terminal 20 according to each of Examples 1 to 3, the thickness t1 (t2) of the Ni layer 33 in the inner circumferential surface portion 23a (the measurement positions 2, 3, 5, and 6) of the recessed portion 23 became smaller than the thickness t4 of the Ni layer 33 in the inner bottom surface portion 23b (the measurement position 4) of the recessed portion 23.

Second Embodiment

A second embodiment of the present invention is now described with reference to FIGS. 16 and 17. In this second embodiment, a positive-electrode terminal 210 is made of a three-layered clad material 230, unlike the positive-electrode terminal 10 made of only pure Al according to the aforementioned first embodiment. The positive-electrode terminal 210 is an example of the "battery terminal" in the claims.

(Structure of Positive-Electrode Terminal)

Figure 16:
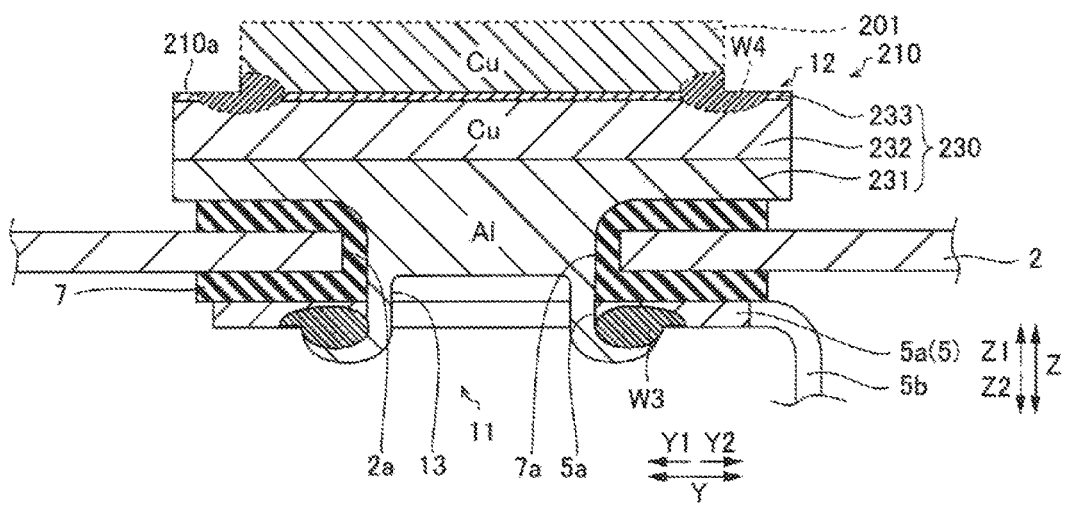
FIG. 16 is a sectional view showing a region around a positive-electrode terminal according to a second embodiment of the present invention.
Figure 17:
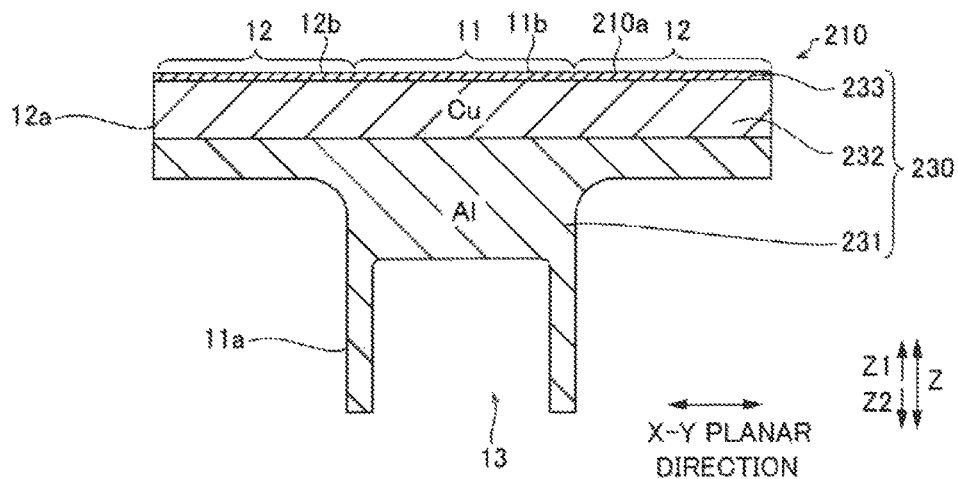
FIG. 17 is a sectional view showing the positive-electrode terminal according to the second embodiment of the present invention.

According to the second embodiment, the positive-electrode terminal 210 is made of a three-layered clad material 230 in which an Al layer 231 of pure Al, a Cu layer 232 of pure Cu, and a Ni layer 233 of pure Ni are bonded to each other by rolling in a state where these are stacked in this order from a Z2 side, as shown in FIGS. 16 and 17. The Al layer 231, the Cu layer 232, and the Ni layer 233 are examples of the "first metal layer", the "second metal layer", and the "third metal layer" in the claims, respectively.

The Al layer 231 is exposed on a surface on a Z2 side and an outer circumferential surface portion 11a of a shaft portion 11 and on a surface on the Z2 side and the Z2 side of a side end 12a of a flange portion 12, as shown in FIG. 17. This Al layer 231 is bonded to a positive-electrode collector 5 from the Z2 side by laser welding, as shown in FIG. 16. By this laser welding, a weld portion W3 (a densely shaded region) is formed.

The Cu layer 232 is exposed on the Z1 side beyond the Al layer 231 and the Z2 side beyond the Ni layer 233 in the side end 12a of the flange portion 12, as shown in FIG. 17.

The Ni layer 233 is exposed on a surface portion 11b of the shaft portion 11 on the Z1 side and on a surface portion 12b on the Z1 side and the Z1 side of the side end 12a of the flange portion 12. In other words, the Ni layer 233 is located to entirely cover the surface portion 11b of the shaft portion 11 and the surface portion 12b of the flange portion 12 in an end 210a of the positive-electrode terminal 210 on the Z1 side. The Ni layer 233 is bonded to a bus bar 201 made of pure Cu from the Z1 side by laser welding, as shown in FIG. 16. By the laser welding, a weld portion W4 (a densely shaded region) is formed. The remaining structures of the second embodiment are similar to those of the aforementioned first embodiment.

According to the second embodiment, the following effects can be obtained.

According to the second embodiment, the positive-electrode terminal 210 is made of the clad material 230 in which the Al layer 231 of pure Al, the Cu layer 232 of pure Cu, and the Ni layer 233 of pure Ni are bonded to each other in the state where these are stacked in this order. Thus, similarly to the aforementioned first embodiment, occurrence of corrosion on an interfaces between the metal layers bonded to each other (the interface between the Al layer 231 and the Cu layer 232 and the interface between the Cu layer 232 and the Ni layer 233) can be significantly reduced.

According to the second embodiment, the Ni layer 233 made of pure Ni is formed to entirely cover the surface portion 11b of the shaft portion 11 and the surface portion 12b of the flange portion 12 in the end 210a of the positive-electrode terminal 210 on a first side (Z1 side) in a shaft direction (direction Z) in which the shaft portion 11 extends. Thus, in the end 210a of the positive-electrode terminal 210 on the Z1 side, in which the Ni layer 233 is formed, the positive-electrode terminal 210 can be easily welded to the bus bar 201 by laser welding, and even if the bus bar 201 is a large flat plate-shaped member, the bus bar 201 can be reliably welded to the positive-electrode terminal 210 by the Ni layer 233 formed to entirely cover the surface portion 11b and the surface portion 12b. Furthermore, the clad material 230 including the Ni layer 233 made of pure Ni is employed, whereby no step for Ni plating processing is necessary, and hence complication of manufacturing steps for the negative-electrode terminal 210 can be significantly reduced.

Third Embodiment

A third embodiment of the present invention is now described with reference to FIG. 18. In a negative-electrode terminal 320 according to this third embodiment, in addition to the aforementioned first embodiment, a reaction suppression layer 334 is arranged between an Al layer 31 and a Cu layer 32. The negative-electrode terminal 320 is an example of the "battery terminal" in the claims.

Figure 18:
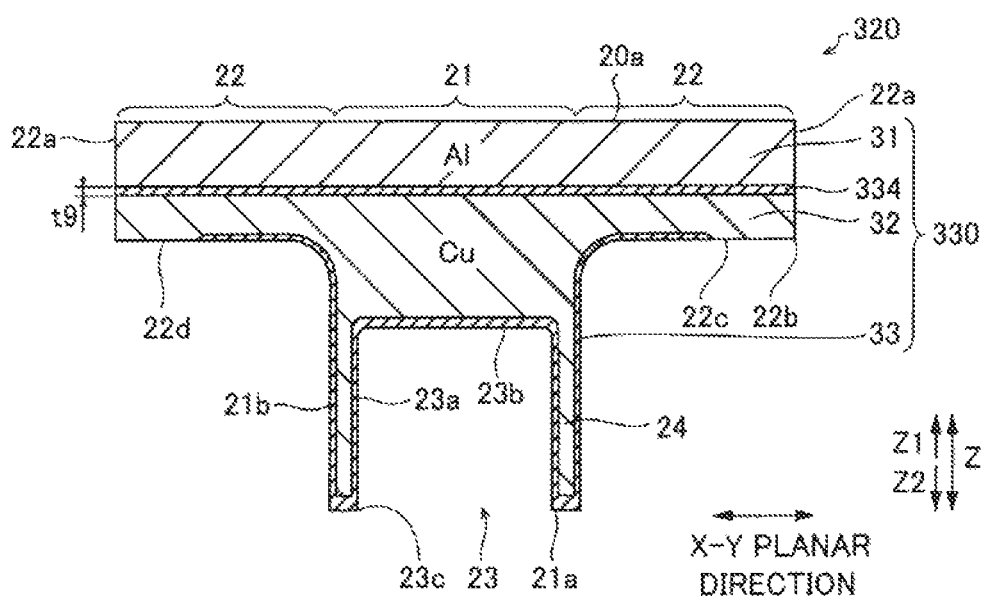
FIG. 18 is a sectional view showing a negative-electrode terminal according to a third embodiment of the present invention.

The negative-electrode terminal 320 according to the third embodiment of the present invention is made of a four-layered clad material 330 in which the Al layer 31 of pure Al, the reaction suppression layer 334 of pure Ni, the Cu layer 32 of pure Cu, and a Ni layer 33 of pure Ni are bonded to each other by rolling in a state where these are stacked in this order from a Z1 side, as shown in FIG. 18. In other words, the reaction suppression layer 334 is arranged between the Al layer 31 and the Cu layer 32.

The reaction suppression layer 334 has a function of suppressing generation of a fragile Al—Cu alloy on an interface between the Al layer 31 and the Cu layer 32 resulting from reaction of pure Al of which the Al layer 31 is made and pure Cu of which the Cu layer 32 is made. The reaction suppression layer 334 is formed over the substantially entire interface between the Al layer 31 and the Cu layer 32.

This reaction suppression layer 334 is made of Ni, which is more expensive than Al and Cu. Therefore, the thickness t9 of the reaction suppression layer 334 is preferably small in terms of material costs, and specifically, the thickness t9 of the reaction suppression layer 334 is preferably not more than about 10% of the thickness of a flange portion 22 in a direction Z.

A method for manufacturing the negative-electrode terminal 320 according to the third embodiment is similar to that according to the aforementioned first embodiment except that the clad material in which the Al layer 31 of Al, the reaction suppression layer 334 of Ni, the Cu layer 32 of Cu, and the Ni layer 22 of Ni are bonded to each other in the state where these are stacked in this order from the Z1 side is formed by continuously rolling an Al plate material, a Ni plate material, a Cu plate material, and a Ni plate material at a prescribed rolling reduction.

According to the third embodiment, the following effects can be obtained.

According to the third embodiment, the clad material 330 includes the reaction suppression layer 334 arranged (bonded) between the Al layer 31 and the Cu layer 32 and configured to suppress the reaction of pure Al of which the Al layer 31 is made and pure Cu of which the Cu layer 32 is made. Thus, the reaction suppression layer 334 can reliably suppress generation of a fragile intermetallic compound (Al—Cu alloy) caused by the reaction of Al of which the Al layer 31 is made and Cu of which the Cu layer 32 is made, and hence a reduction in the bonding strength between the Al layer 31 and the Cu layer 32 resulting from the intermetallic compound can be reliably and significantly reduced. Furthermore, the reaction suppression layer 334 can more reliably suppress corrosion. The remaining effects of the third embodiment are similar to those of the aforementioned first embodiment.

[Modification]

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the Al layer 31 (231) is made of pure Al, the Cu layer 32 (232) is made of pure Cu, and the Ni layer 33 (233) is made of pure Ni in each of the aforementioned first to third embodiments, the present invention is not restricted to this. According to the present invention, an Al alloy, a Cu alloy, and a Ni alloy may alternatively be employed instead of pure Al, pure Cu, and pure Ni, respectively. The Al alloy includes an Al—Mn based alloy in No. A3000s of JIS etc., for example. The Cu alloy includes a Cu—Fe based alloy, which is C194, etc., for example. The Ni alloy includes a Ni—Cu based alloy in No. NW4400s of JIS etc., for example. The Al-based alloy, the Cu-based alloy, and the Ni-based alloy preferably contain at least about 90 mass % of Al, at least about 90 mass % of Cu, and at least about 90 mass % of Ni, respectively.

While the battery terminal includes the recessed portion in each of the aforementioned first to third embodiments, the present invention is not restricted to this. According to the present invention, the battery terminal may not have the recessed portion so far as the same includes the shaft portion and the flange portion that radially expands from the shaft portion. In this case, no step for swaging the battery terminal is necessary. In this case, the Ni layer is located in the end of the battery terminal on the first side in the shaft direction and in the outer circumferential surface portion around the end, and hence the battery terminal can be easily welded to another member such as a collector by laser welding. Alternatively, the battery terminal may have a shaft portion that extends to both of the first side and a second side in the shaft direction with respect to the flange portion.

While the negative-electrode collector 6 is swaged by bending the wall portion 24 that surrounds the recessed portion 23 of the negative-electrode terminal 20, and the negative-electrode terminal 20 and the negative-electrode collector 6 are bonded to each other by laser welding in the swaged state in the aforementioned first embodiment, the present invention is not restricted to this. According to the present invention, a region around the opening of the recessed portion of the battery terminal and a protrusion portion of the collector may alternatively be bonded to each other by performing laser welding or the like in a state where the protrusion portion of the collector having the protrusion portion is inserted into the recessed portion of the battery terminal, for example.

While the reaction suppression layer 334 is made of pure Ni in the aforementioned third embodiment, the present invention is not restricted to this. According to the present invention, the reaction suppression layer may alternatively be made of a Ni alloy or another material.

While the battery terminal is made of the three-layered clad material in each of the aforementioned first and second embodiments, and the negative-electrode terminal 320 is made of the four-layered clad material in the aforementioned third embodiment, the present invention is not restricted to this. According to the present invention, the battery terminal may alternatively be made of a five-or-more-layered clad material.

What is claimed is:

1. A battery terminal, made of a clad material in which a first metal layer made of an Al-based alloy, a second metal layer made of a Cu-based alloy, and a third metal layer made of a Ni-based alloy are bonded to each other in a state where the first metal layer, the second metal layer, and the third metal layer are stacked in this order, comprising:
   a shaft portion; and
   a flange portion that radially expands from the shaft portion, wherein
   the third metal layer is located at least in an end of the shaft portion on a first side in a shaft direction in which the shaft portion extends, and
   in the shaft direction, a thickness of the third metal layer in the end of the shaft portion is smaller than a length of the first metal layer and a length of the second metal layer.

2. The battery terminal according to claim 1, wherein the third metal layer is located in an outer circumferential surface portion of the shaft portion.

3. The battery terminal according to claim 1, wherein the second metal layer made of the Cu-based alloy is exposed on an outer edge of the flange portion on the first side in the shaft direction.

4. The battery terminal according to claim 3, wherein the second metal layer is annularly exposed along the outer edge of the flange portion on the first side in the shaft direction.

5. The battery terminal according to claim 1, wherein the shaft portion is provided with a recessed portion on a side bonded to a collector of a battery on the first side in the shaft direction, and
   the third metal layer is located in an inner circumferential surface portion of the recessed portion.

6. The battery terminal according to claim 5, wherein a thickness of the third metal layer in the end of the shaft portion is larger than a thickness of the third metal layer in the inner circumferential surface portion of the recessed portion.

7. The battery terminal according to claim 6, wherein
the thickness of the third metal layer in the end of the shaft portion is at least twice the thickness of the third metal layer in the inner circumferential surface portion of the recessed portion.

8. The battery terminal according to claim 5, wherein
in the inner circumferential surface portion of the recessed portion, a thickness of the third metal layer closer to an opening of the recessed portion is larger than a thickness of the third metal layer closer to an inner bottom surface portion of the recessed portion.

9. The battery terminal according to claim 5, wherein
the third metal layer is located in an inner bottom surface portion of the recessed portion in addition to the inner circumferential surface portion of the recessed portion, and
a thickness of the third metal layer in the inner circumferential surface portion of the recessed portion is smaller than a thickness of the third metal layer in the inner bottom surface portion of the recessed portion.

10. The battery terminal according to claim 1, wherein
in the end on the first side in the shaft direction, a thickness of the third metal layer in the shaft direction is at least 20 μm.

11. The battery terminal according to claim 1, wherein
the clad material further includes a reaction suppression layer arranged between the first metal layer and the second metal layer and configured to suppress reaction of the Al-based alloy of which the first metal layer is made and the Cu-based alloy of which the second metal layer is made.

12. The battery terminal according to claim 1, wherein
the third metal layer is located in a surface portion of the flange portion on the first side, and
in the shaft direction, a thickness of the third metal layer in the end of the shaft portion on the first side is larger than a thickness of the third metal layer in the surface portion of the flange portion on the first side.

13. The battery terminal according to claim 1, wherein
the flange portion radially expands from the shaft portion on a second side in the shaft direction, and
the third metal layer is located in the end on the first side of the shaft portion that protrudes from the flange portion.

14. The battery terminal according to claim 1, wherein
the flange portion radially expands in the end of the shaft portion on the first side in the shaft direction, and
the third metal layer entirely covers a surface portion of the shaft portion on the first side and a surface portion of the flange portion on the first side.

15. A method for manufacturing a battery terminal, comprising:
forming a clad material in which a first metal layer made of an Al-based alloy, a second metal layer made of a Cu-based alloy, and a third metal layer made of a Ni-based alloy are bonded to each other in a state where the first metal layer, the second metal layer, and the third metal layer are stacked in this order; and
pressing the clad material to form a shaft portion and a flange portion that radially expands from the shaft portion, wherein
pressing the clad material includes pressing the clad material to locate the third metal layer at least in an end of the shaft portion on a first side in a shaft direction in which the shaft portion extends, and
in the shaft direction, having a thickness being smaller than a length of the first metal layer and a length of the second metal layer.

16. The method for manufacturing a battery terminal according to claim 15, wherein
pressing the clad material further includes pressing the clad material to locate the third metal layer in an outer circumferential surface portion of the shaft portion in addition to the end on the first side in the shaft direction.

17. The method for manufacturing a battery terminal according to claim 15, wherein
pressing the clad material further includes pressing the clad material to expose the second metal layer made of the Cu-based alloy on an outer edge of the flange portion on the first side in the shaft direction.

18. The method for manufacturing a battery terminal according to claim 15, wherein
pressing the clad material further includes pressing the clad material to locate the third metal layer in the end of the shaft portion and an inner circumferential surface portion of a recessed portion while forming the recessed portion in the shaft portion on a side bonded to a collector of a battery on the first side in the shaft direction.

19. The method for manufacturing a battery terminal according to claim 15, wherein
forming the clad material includes forming the clad material such that a thickness of the third metal layer is smaller than a thickness of the first metal layer and a thickness of the second metal layer.

* * * * *